United States Patent
Tian et al.

(10) Patent No.: US 11,910,370 B2
(45) Date of Patent: Feb. 20, 2024

(54) ENHANCEMENTS ON TRANSMISSIONS WITH PARTIAL-INTERLACE ASSIGNMENT

(71) Applicant: QUALCOMM Incorporated, San Diego, CA (US)

(72) Inventors: Qingjiang Tian, San Diego, CA (US); Xiaoxia Zhang, San Diego, CA (US); Jing Sun, San Diego, CA (US); Kapil Bhattad, Bangalore (IN); Srinivas Yerramalli, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/721,646

(22) Filed: Apr. 15, 2022

(65) Prior Publication Data

US 2022/0240252 A1 Jul. 28, 2022

Related U.S. Application Data

(62) Division of application No. 16/374,593, filed on Apr. 3, 2019, now Pat. No. 11,337,214.

(30) Foreign Application Priority Data

Apr. 6, 2018 (IN) .............................. 201841013239

(51) Int. Cl.
*H04W 28/02* (2009.01)
*H04W 72/04* (2023.01)
(Continued)

(52) U.S. Cl.
CPC ... *H04W 72/0453* (2013.01); *H04W 28/0231* (2013.01); *H04W 72/21* (2023.01)

(58) Field of Classification Search
CPC ......... H04W 28/0231; H04W 72/0453; H04W 72/121; H04W 72/1268; H04W 72/21;
(Continued)

(56) References Cited

U.S. PATENT DOCUMENTS

2014/0050165 A1 2/2014 Park
2017/0111894 A1 4/2017 Chen et al.
(Continued)

FOREIGN PATENT DOCUMENTS

WO WO-2014027768 A1 2/2014

OTHER PUBLICATIONS

Ericsson ("on AUL Configuration and Activation", 3GPP Draft; R1-1802532, 3rd Generation Partnership Project (3GPP), Mobile Competence Centre; Feb. 16, 2018 (Year: 2018).*
(Continued)

*Primary Examiner* — Melvin C Marcelo
*Assistant Examiner* — Natali Pascual Peguero
(74) *Attorney, Agent, or Firm* — Holland & Hart LLP

(57) ABSTRACT

Methods, systems, and devices for wireless communications are described. The described techniques provide for a base station transmitting to a user equipment (UE) a partial bandwidth configuration for uplink transmissions, where the partial bandwidth configuration may indicate a channel interlace and a portion of a channel bandwidth, for example, for autonomous uplink (AUL) transmissions. The base station may also transmit to the UE an AUL configuration including a group identifier. The UE may determine a starting offset with respect to an AUL subframe for a partial bandwidth transmission based on the group identifier. In some cases, different UEs may be grouped into groups of UEs allocated non-overlapping resources, and UEs allocated overlapping resources may have different starting offsets to begin transmitting. According to the determined starting (Continued)

offset, the UE may perform the partial bandwidth transmission over the channel interlace and the portion of the channel bandwidth.

20 Claims, 23 Drawing Sheets

(51) Int. Cl.
*H04W 72/0453* (2023.01)
*H04W 72/21* (2023.01)
(58) Field of Classification Search
CPC .......... H04W 74/006; H04W 74/0808; H04W 74/0891
See application file for complete search history.

(56) References Cited

U.S. PATENT DOCUMENTS

2017/0280476 A1  9/2017  Yerramalli et al.
2019/0313409 A1  10/2019  Tian et al.

OTHER PUBLICATIONS

Qualcomm: "Remaining Details of Resource Allocation and Configuration for AUL", 3GPP TSG RAN WG1 Meeting #92, R1-1802314, Athens, Greece, Feb. 26, 2018-Mar. 2, 2018, 3 Pages, Feb. 17, 2018, XP051397842.
Ericsson: "On AUL Configuration and Activation", 3GPP Draft, R1-1802532, 3GPP TSG RAN WG1 Meeting #92, On AUL Configuration and Activation, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018 (Feb. 16, 2018), 4 Pages, XP051397323, Retrieved from the Internet: URL: http://www.3gpp.org/ftp/tsg_ran/WG1_RL1/TSGR1_92/Docs/ [retrieved on Feb. 16, 2018], Section 1, Section 2.1, Proposal 3.
Huawei., et al., "Remaining Details on AUL Channel Access", 3GPP Draft; R1-1801375, 3GPP TSG RAN WG1 Meeting #92, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018 (Feb. 16, 2018), 7 Pages, XP051397400, Retrieved from the Internet: URL: http://www.3gpp.org/ftp/tsg_ran/WG1_RL1/TSGR1_92/Docs/ [retrieved on Feb. 16, 2018], Section 4.
INTEL., et al., "WF on AUL Channel Access", 3GPP Draft; R1-1721245_WF on AUL Channel Access_V2, 3rd Generation Partnership Project (3GPP), Mobile Competence Centre, 650, Route Des Lucioles; F-06921 Sophia-Antipolis Cedex, France, vol. RAN WG1, No. Reno, US; Nov. 27, 2017-Dec. 1, 2017, Dec. 1, 2017 (Dec. 1, 2017), 4 Pages, XP051370527, Retrieved from the Internet: URL: http://www.3gpp.org/ftp/tsg_ran/WG1_RL1/TSGR1_91/Docs/ [retrieved on Dec. 1, 2017], Proposal 2.
International Preliminary Report on Patentability—PCT/US2019/025863, The International Bureau of WIPO—Geneva, Switzerland, dated Oct. 15, 2020.
International Search Report and Written Opinion—PCT/US2019/025863—ISA/EPO—dated Jul. 31, 2019.
Nokia, et al., "Resource Allocation for Autonomous UL Access", 3GPP Draft, R1-1802266, 3GPP TSG RAN WG1 Meeting #92, LAA RES ALLOC, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 16, 2018 (Feb. 16, 2018), 7 Pages, XP051397462, Retrieved from the Internet: URL: http://www.3gpp.org/ftp/tsg_ran/WG1_RL1/TSGR1_92/Docs/ [retrieved on Feb. 16, 2018], Section 1, Section 2.2.
Partial International Search Report—PCT/US2019/025863—ISA/EPO—dated Jun. 6, 2019.

\* cited by examiner

ENHANCEMENTS ON TRANSMISSIONS WITH PARTIAL-INTERLACE ASSIGNMENT

CROSS REFERENCES

The present Application for Patent is a Divisional of U.S. patent application Ser. No. 16/374,593 by TIAN et al., entitled "ENHANCEMENTS ON TRANSMISSIONS WITH PARTIAL-INTERLACE ASSIGNMENT" filed Apr. 3, 2019, which claims benefit of India Provisional Patent Application No. 201841013239 by TIAN et al., entitled "ENHANCEMENTS ON TRANSMISSIONS WITH PARTIAL-INTERLACE ASSIGNMENT," filed Apr. 6, 2018, assigned to the assignee hereof, and expressly incorporated by reference in its entirety.

BACKGROUND

The following relates generally to wireless communications, and more specifically to enhancements on transmissions with partial-interlace assignment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

In some cases, a UE may be configured for autonomous uplink (AUL) transmissions and allocated resources for the AUL transmissions occupying a partial channel bandwidth. UEs allocated the partial channel bandwidth for AUL transmission may be configured with a same starting offset value at which the UEs may begin transmitting. In such cases, the total number of UEs that may transmit AUL transmissions during one AUL subframe may be limited to the total number of orthogonal interlaces in the AUL subframe. Further, if one of the UEs does not have data to transmit in the AUL subframe, its allocated interlace may be unused for that AUL subframe when another UE may have been able to use the same resources to transmit data.

SUMMARY

The described techniques relate to improved methods, systems, devices, or apparatuses that support partial-interlace transmission techniques for autonomous uplink (AUL) transmissions. Generally, the described techniques provide for a base station transmitting to a user equipment (UE) a partial bandwidth configuration for uplink transmissions. The partial bandwidth configuration may indicate a channel interlace and a portion of a channel bandwidth, for example, for AUL transmissions. The base station may also transmit to the UE an AUL configuration including a group identifier. The UE may determine a starting offset with respect to an AUL subframe for a partial bandwidth transmission based on the group identifier. In some cases, different UEs may be grouped into groups of UEs allocated non-overlapping resources such that UEs allocated overlapping resources may have different starting offsets at which to begin transmitting. The UE may perform the partial bandwidth transmission, according to the determined starting offset, over the channel interlace and the portion of the channel bandwidth.

A method of wireless communication is described. The method may include receiving a partial bandwidth configuration for uplink transmissions by a UE, where the partial bandwidth configuration may indicate a channel interlace and a portion of a channel bandwidth. The method may include receiving an AUL configuration including a group identifier, determining a starting offset with respect to an AUL subframe for a partial bandwidth transmission by the UE based at least in part on the group identifier, and performing the partial bandwidth transmission according to the determined starting offset over the channel interlace and the portion of the channel bandwidth.

An apparatus for wireless communication is described. The apparatus may include means for receiving a partial bandwidth configuration for uplink transmissions by a UE, where the partial bandwidth configuration may indicate a channel interlace and a portion of a channel bandwidth. The apparatus may include means for means for receiving an AUL configuration including a group identifier, means for determining a starting offset with respect to an AUL subframe for a partial bandwidth transmission by the UE based at least in part on the group identifier, and means for performing the partial bandwidth transmission according to the determined starting offset over the channel interlace and the portion of the channel bandwidth.

Another apparatus for wireless communication is described. The apparatus may include a processor, memory in electronic communication with the processor, and instructions stored in the memory. The instructions may be operable to cause the processor to receive a partial bandwidth configuration for uplink transmissions by a UE, where the partial bandwidth configuration may indicate a channel interlace and a portion of a channel bandwidth. The instructions may be operable to cause the processor to receive an AUL configuration including a group identifier, determine a starting offset with respect to an AUL subframe for a partial bandwidth transmission by the UE based at least in part on the group identifier, and perform the partial bandwidth transmission according to the determined starting offset over the channel interlace and the portion of the channel bandwidth.

A non-transitory computer-readable medium for wireless communication is described. The non-transitory computer-readable medium may include instructions operable to cause a processor to receive a partial bandwidth configuration for uplink transmissions by a UE, where the partial bandwidth configuration may indicate a channel interlace and a portion of a channel bandwidth. The non-transitory computer-readable medium may include instructions operable to cause the processor to receive an AUL configuration including a group identifier, determine a starting offset with respect to an AUL subframe for a partial bandwidth transmission by the UE based at least in part on the group identifier, and perform the partial bandwidth transmission according to the determined starting offset over the channel interlace and the portion of the channel bandwidth.

In some examples of the method, apparatus, and non-transitory computer-readable medium described above, determining the starting offset may include selecting the starting offset from a set of defined starting offset values. In some examples of the method, apparatus, and non-transitory computer-readable medium described above, selecting the starting offset may include randomly selecting the starting offset from the set of defined starting offset values. In some examples of the method, apparatus, and non-transitory computer-readable medium described above, randomly selecting the starting offset may be based at least in part on one or more of: the group identifier for the UE or a slot number of the AUL subframe for the partial bandwidth transmission by the UE.

In some examples of the method, apparatus, and non-transitory computer-readable medium described above, selecting the starting offset may be based at least in part on whether the partial bandwidth transmission of the UE is inside of a maximum channel occupancy time (MCOT). In some examples of the method, apparatus, and non-transitory computer-readable medium described above, the group identifier may be associated with one or more UEs having non-overlapping resource allocations.

Some examples of the method, apparatus, and non-transitory computer-readable medium described above may further include processes, features, means, or instructions for performing a per-interlace listen-before-talk (LBT) procedure by measuring an energy level of at least the portion of the channel interlace based at least in part on the received partial bandwidth configuration. Some examples of the method, apparatus, and non-transitory computer-readable medium described above may further include processes, features, means, or instructions for determining an availability of at least the portion of the channel interlace based at least in part on the per-interlace LBT procedure. Some examples of the method, apparatus, and non-transitory computer-readable medium described above may further include processes, features, means, or instructions for transmitting over the channel interlace based at least in part on the determined availability.

A method of wireless communication is described. The method may include transmitting, to a first UE of a first group of one or more UEs, a first partial bandwidth configuration, where the first partial bandwidth configuration may indicate a first channel interlace and a first portion of a channel bandwidth. The method may include transmitting to the first UE a first AUL configuration including a first group identifier and receiving a first partial bandwidth transmission from the first UE at a first starting offset with respect to an AUL subframe, where the first starting offset is based at least in part on the first group identifier.

An apparatus for wireless communication is described. The apparatus may include means for transmitting, to a first UE of a first group of one or more UEs, a first partial bandwidth configuration, where the first partial bandwidth configuration may indicate a first channel interlace and a first portion of a channel bandwidth. The apparatus may include means for transmitting to the first UE a first AUL configuration including a first group identifier and means for receiving a first partial bandwidth transmission from the first UE at a first starting offset with respect to an AUL subframe, where the first starting offset may be based at least in part on the first group identifier.

Another apparatus for wireless communication is described. The apparatus may include a processor, memory in electronic communication with the processor, and instructions stored in the memory. The instructions may be operable to cause the processor to transmit, to a first UE of a first group of one or more UEs, a first partial bandwidth configuration, where the first partial bandwidth configuration may indicate a first channel interlace and a first portion of a channel bandwidth. The instructions may be operable to cause the processor to transmit to the first UE a first AUL configuration including a first group identifier and receive a first partial bandwidth transmission from the first UE at a first starting offset with respect to an AUL subframe, where the first starting offset may be based at least in part on the first group identifier.

A non-transitory computer-readable medium for wireless communication is described. The non-transitory computer-readable medium may include instructions operable to cause a processor to transmit, to a first UE of a first group of one or more UEs, a first partial bandwidth configuration, where the first partial bandwidth configuration may indicate a first channel interlace and a first portion of a channel bandwidth. The non-transitory computer-readable medium may include instructions operable to cause the processor to transmit to the first UE a first AUL configuration including a first group identifier and receive a first partial bandwidth transmission from the first UE at a first starting offset with respect to an AUL subframe, where the first starting offset may be based at least in part on the first group identifier.

Some examples of the method, apparatus, and non-transitory computer-readable medium described above may further include processes, features, means, or instructions for receiving a second partial bandwidth transmission from a second UE of the first group of one or more UEs, where the second partial bandwidth transmission may be received at the first starting offset with respect to the AUL subframe. Some examples of the method, apparatus, and non-transitory computer-readable medium described above may further include processes, features, means, or instructions for transmitting to the second UE a second partial bandwidth configuration, the second partial bandwidth configuration indicating a second channel interlace and the first portion of the channel bandwidth, where the second partial bandwidth transmission may be received over the second channel interlace and the first portion of the channel bandwidth.

Some examples of the method, apparatus, and non-transitory computer-readable medium described above may further include processes, features, means, or instructions for transmitting a second AUL configuration to the second UE, where the second AUL configuration may include the first group identifier. In some examples of the method, apparatus, and non-transitory computer-readable medium described above, the first starting offset may be from a set of defined starting offset values.

Some examples of the method, apparatus, and non-transitory computer-readable medium described above may further include processes, features, means, or instructions for determining the first AUL configuration based at least in part on the first partial bandwidth configuration. In some examples of the method, apparatus, and non-transitory computer-readable medium described above, the first group of one or more UEs may include UEs assigned to non-overlapping channel interlaces.

Some examples of the method, apparatus, and non-transitory computer-readable medium described above may further include processes, features, means, or instructions for receiving a second partial bandwidth transmission from a second UE of a second group of one or more UEs, where the second partial bandwidth transmission may be received at a second starting offset with respect to the AUL subframe. Some examples of the method, apparatus, and non-transitory computer-readable medium described above may further include processes, features, means, or instructions for transmitting to the second UE a second AUL configuration including a second group identifier for the second UE, where the second starting offset may be based at least in part on the second group identifier.

A method of wireless communication is described. The method may include receiving a channel interlace configuration for transmissions by a UE in a shared radio frequency spectrum band and performing a per-interlace LBT procedure by measuring an energy level of at least a portion of a channel interlace of the shared radio frequency spectrum band based at least in part on the received channel interlace configuration. The method may include determining an availability of the channel interlace based at least in part on the per-interlace LBT procedure and transmitting over the channel interlace based at least in part on the determined availability.

An apparatus for wireless communication is described. The apparatus may include means for receiving a channel interlace configuration for transmissions by a UE in a shared radio frequency spectrum band and means for performing a per-interlace LBT procedure by measuring an energy level of at least a portion of a channel interlace of the shared radio frequency spectrum band based at least in part on the received channel interlace configuration. The apparatus may include means for determining an availability of the channel interlace based at least in part on the per-interlace LBT procedure and means for transmitting over the channel interlace based at least in part on the determined availability.

Another apparatus for wireless communication is described. The apparatus may include a processor, memory in electronic communication with the processor, and instructions stored in the memory. The instructions may be operable to cause the processor to receive a channel interlace configuration for transmissions by a UE in a shared radio frequency spectrum band and perform a per-interlace LBT procedure by measuring an energy level of at least a portion of a channel interlace of the shared radio frequency spectrum band based at least in part on the received channel interlace configuration. The instructions may be operable to cause the processor to determine an availability of the channel interlace based at least in part on the per-interlace LBT procedure and transmit over the channel interlace based at least in part on the determined availability.

A non-transitory computer-readable medium for wireless communication is described. The non-transitory computer-readable medium may include instructions operable to cause a processor to receive a channel interlace configuration for transmissions by a UE in a shared radio frequency spectrum band and perform a per-interlace LBT procedure by measuring an energy level of at least a portion of a channel interlace of the shared radio frequency spectrum band based at least in part on the received channel interlace configuration. The non-transitory computer-readable medium may include instructions operable to cause the processor to determine an availability of the channel interlace based at least in part on the per-interlace LBT procedure and transmit over the channel interlace based at least in part on the determined availability.

In some examples of the method, apparatus, and non-transitory computer-readable medium described above, performing the per-interlace LBT procedure may include performing a fast Fourier transform on the measured energy level of at least the portion of the channel interlace. In some examples of the method, apparatus, and non-transitory computer-readable medium described above, performing the per-interlace LBT procedure may include measuring the energy level of a subset of resource elements (REs) of the portion of the channel interlace.

In some examples of the method, apparatus, and non-transitory computer-readable medium described above, performing the per-interlace LBT procedure may include receiving an indication of a starting orthogonal frequency-division multiplexing (OFDM) symbol for the UE. Some examples of the method, apparatus, and non-transitory computer-readable medium described above may further include processes, features, means, or instructions for transmitting a filler signal following the per-interlace LBT procedure and prior to the indicated starting OFDM symbol based at least in part on a result of the per-interlace LBT procedure. In some examples of the method, apparatus, and non-transitory computer-readable medium described above, the filler signal may be transmitted using a subset of REs of the portion of the channel interlace. In some examples of the method, apparatus, and non-transitory computer-readable medium described above, the filler signal may include an extended cyclic prefix.

Some examples of the method, apparatus, and non-transitory computer-readable medium described above may further include processes, features, means, or instructions for determining an energy level of a second channel interlace adjacent to the channel interlace, where the filler signal may be transmitted based at least in part on the energy level of the second channel interlace.

In some examples of the method, apparatus, and non-transitory computer-readable medium described above, the channel interlace configuration may include a scheduled uplink (SUL) configuration. Some examples of the method, apparatus, and non-transitory computer-readable medium described above may further include processes, features, means, or instructions for performing a full-interlace LBT procedure by measuring an energy level of a full-channel interlace of the shared radio frequency spectrum band.

DETAILED DESCRIPTION

Figure 1:
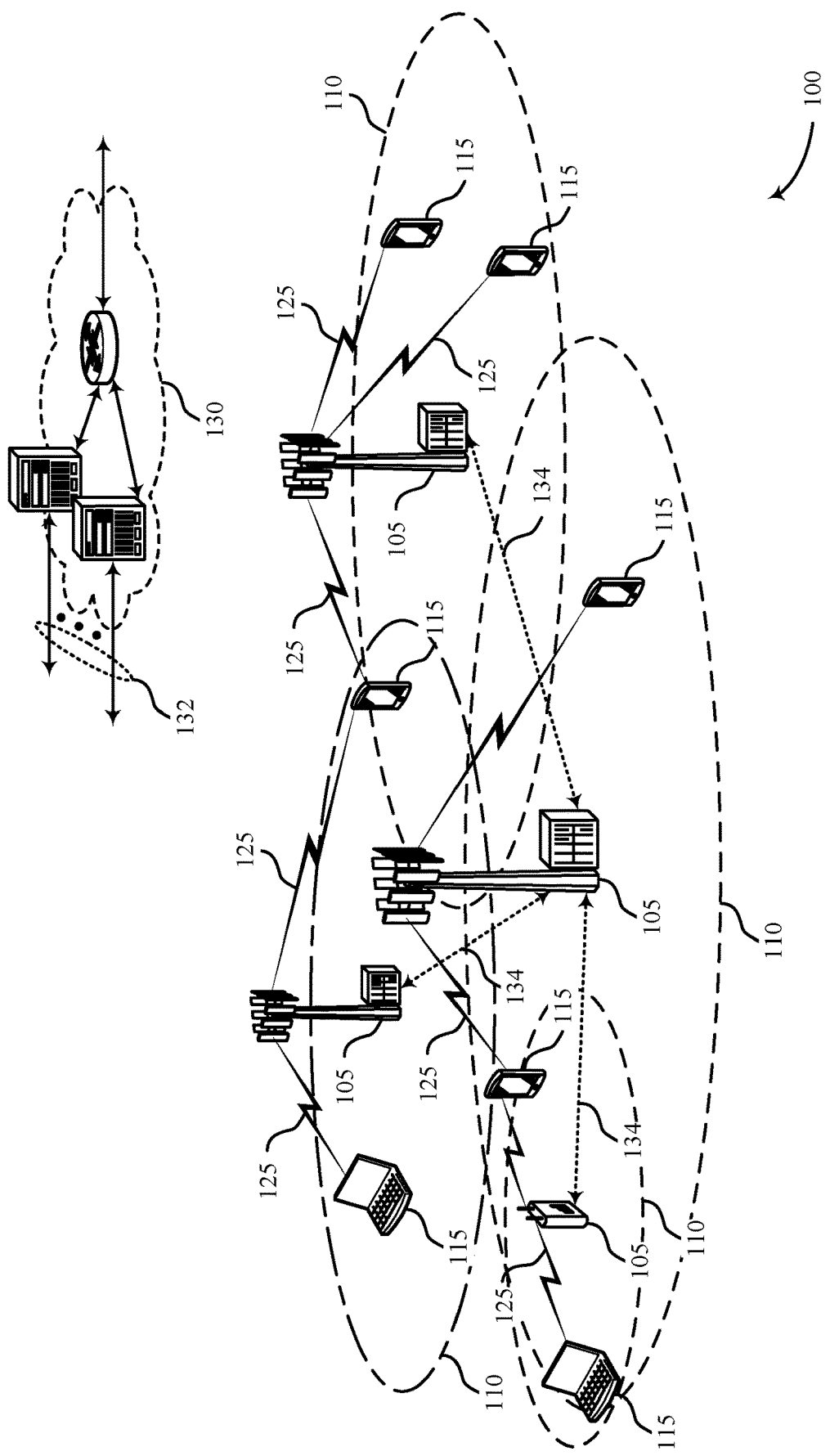
FIG. 1 illustrates an example of a wireless communications system that supports partial-interlace transmission techniques for autonomous uplink (AUL) transmissions in accordance with aspects of the present disclosure.

A base station and a user equipment (UE) may communicate using uplink transmissions from the UE to the base station and downlink transmissions from the base station to the UE. An uplink transmission may be scheduled by sending the UE an uplink grant, which signals to the UE that it may transmit uplink data on configured or scheduled resources. In some cases, a UE may have a capability to perform an autonomous uplink (AUL) transmission of uplink data. AUL may refer to the process by which a UE transmits uplink signals to a base station without first receiving an uplink grant. AUL functionality may be configured using, for example, radio resource control (RRC) messaging.

In some cases, a UE may be allocated resources occupying a partial channel bandwidth for the AUL transmissions (i.e., UEs configured for AUL transmissions may be allocated resources occupying a particular portion of a bandwidth rather than resources occupying the full radio frequency bandwidth). In some cases, multiple UEs 115 with a partial channel bandwidth allocation for AUL transmission may each be configured with the same starting offset value. In such cases, the total number of UEs that may transmit AUL transmissions during one AUL subframe may be limited to the total number of orthogonal interlaces in the AUL subframe, and a resource utilization efficiency may be relatively lower. Further, if one of the UEs 115 does not have data to transmit in the AUL subframe, the interlace allocated to the UE 115 may be unused for that AUL subframe when another UE may have been able to use the same resources to transmit data. Group-based starting offset values for partial-interlace assigned UEs 115 may provide for other UEs assigned a later starting offset value for AUL transmission to make use of resources left unused by a first, earlier assigned, group of UE.

For example, a base station and a first UE may establish a first connection and the base station and a second UE may establish a second connection. The first UE and the second UE may be assigned to respective first and second groups of UEs. The base station may transmit a group identifier to the each UE of the first and second groups of UEs, where each group of UEs is made of up UEs assigned non-overlapping resources. Based on the group identifiers, the UEs of each of the first and second groups of UEs may determine group-based starting offset values for AUL transmissions. The UEs may select its starting offset value (e.g., randomly) from a set of defined starting offset values for AUL transmissions as a function of the group identifier received from the base station, for example, in an AUL configuration. In this context, the term "randomly" may include the use of a pseudorandom selection mechanism or algorithm. In this way, the base station may group UEs located within its coverage area into multiple groups, where each group of UEs, as identified by its corresponding group identifier, may transmit according to a unique starting offset value. Each UE of the first group of UEs may transmit together at a first time according to a first starting offset value, and each UE of the second group of UEs may transmit together at a second time according to a second starting offset value. Thus, as each UE of each group is allocated non-overlapping resources within its respective group of UEs, no two UEs block each other by transmitting on the same frequency resources at the same time.

Further, group-based starting offset values for partial-interlace assigned UEs may provide relatively increased utilization of the medium when groups of UEs having earlier-assigned starting offset values do not have data to transmit and thus allowing later-assigned UEs to utilize the same resources to transmit data. In some cases, however, a UE employing a full-bandwidth listen-before-talk (LBT) procedure may detect transmissions from other UEs across all interlaces rather than only the particular interlace on which the UE is to transmit, and thus the transmission of an earlier-transmitting UE may unnecessarily block the later-transmitting UE. Therefore, the later-transmitting UE may perform a per-interlace LBT procedure in which the UE measures the energy of its assigned interlace rather than a full bandwidth, so as not to be unnecessarily blocked from transmitting.

Aspects of the disclosure are initially described in the context of a wireless communications system. Aspects of the disclosure are further illustrated by and described with reference to apparatus diagrams, system diagrams, and flowcharts that relate to partial-interlace transmission techniques for AUL transmissions.

FIG. 1 illustrates an example of a wireless communications system 100 that supports partial-interlace transmission techniques for AUL transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The wireless communications system 100 may also operate in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ a channel access procedure, such as a clear channel assessment (CCA) procedure, a LBT procedure, and the like. A LBT procedures to ensure a frequency channel is clear before transmitting data. The channel access procedure may allow the wireless device to capture the channel for a transmission opportunity, such as a maximum channel occupancy time (MCOT), a Wi-Fi transmission opportunity (TXOP), and the like. In some instances, the wireless device may share a portion of the transmission opportunity. For example, a UE may capture the shared channel for a transmission opportunity to be used for AUL.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both. In some cases, a UE 115 may perform an LBT procedure prior to performing an AUL transmission.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (UTRA) (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as NR systems may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, aspects of the wireless communications system 100 may be configured as a MuLTEFire network. A MuLTEFire network may include base stations 105 communicating with UEs 115 in unlicensed radio frequency spectrum band, e.g., without a licensed radio frequency anchor carrier. For example, the MuLTEFire network may operate without an anchor carrier in licensed radio frequency spectrum.

In some examples of the wireless communications system 100, such as MuLTEFire, FeLAA, and NR, a UE 115 may be configured for autonomous uplink transmission as an AUL UE 115. A base station 105 may schedule a UE 115 for uplink communications through an assignment or grant of resources. In some cases, the base station 105 may configure the UE 115 to autonomously transmit uplink communications according to an autonomous uplink configuration. In such cases, the base station 105 may not be aware of particular timings for uplink transmissions, due to the autonomous nature of such transmissions and due to the contention-based access to the shared radio frequency spectrum band.

In some aspects, a UE 115 may receive, from a base station 105, a group identifier of the UE. The UE 115 may receive, from the base station 105, an indication of one or more group identifiers associated with unscheduled communications (e.g., AUL communications) with the base station 105 during a time period. The UE 115 may contend, based on the group identifier of the UE and the one or more group identifiers received from the base station, for access to a set of AUL resources during the time period. The UE 115 may perform, based on the contending, an AUL transmission to the base station 105 using the set of AUL resources.

In some cases, UEs 115 configured for AUL transmissions may be allocated resources to occupy a full channel bandwidth. In such cases, the base station 105 may configure the UE 115 to randomly select a starting offset value from a set of starting offset values (e.g., physical uplink shared channel (PUSCH) starting offset values). In some cases, the set of starting offset values may be the same set of starting offset values as for partial channel bandwidth-allocated UEs 115. In some cases, the set of starting offset values for AUL transmissions inside of an MCOT transmission opportunity may be different than the set of starting offset values for AUL transmissions outside of the MCOT transmission opportunity. The UE 115 may then select one value from the set of starting offset values to use as a starting offset value for each AUL transmission. In this way, different UEs 115 of a group of UEs 115 may be multiplexed in time (i.e., TDM), as UEs 115 having selected an earlier starting offset value may cause UEs 115 having selected a later offset value to fail a CCA procedure if the earlier UE 115 is still transmitting at the time of the later starting value offset.

Alternatively, UEs 115 configured for AUL transmissions may be allocated resources to occupy a partial channel bandwidth. In such cases, a base station 105 may configure the UE 115 with a particular starting offset value (e.g., an AUL-specific PUSCH start offset value) for AUL transmissions. This may be performed additionally or alternatively to, for example, the UE 115 selecting its own starting offset value from a possible set of values. Configuring the UE 115 with an AUL starting offset value may prevent multiple UEs 115 from blocking each other when allocated non-overlapping resources (i.e., in FDM). In some cases, the base station 105 may configure the UE 115 with a first starting offset value for AUL transmissions inside of an MCOT transmission opportunity and a second starting offset value for AUL transmissions outside of the MCOT transmission opportunity, where the first starting offset value may be different than the second starting offset value. In some cases, the base station 105 may configure multiple UEs 115 (e.g., a subset of UEs served by the base station 105, such as all UE 115 within a given portion of the geographical coverage area 110 of the base station 105) with the same starting offset value or values for AUL transmissions in a particular subframe. The base station 105 may select a starting offset value from a set of starting offset values defined for AUL transmissions from UEs 115. This set of starting offset values may be, for example, the same set of starting offset values from which the UEs 115 may select when the UEs 115 are allocated a full channel bandwidth for AUL transmissions.

In some cases, multiple UEs 115 with a partial channel bandwidth allocated for AUL transmission may each be configured with the same starting offset value. In such cases, the total number of UEs that may transmit AUL transmissions during one AUL subframe may be limited to the total number of orthogonal interlaces in the AUL subframe. Thus, overprovisioning of resources may not be supported, and a resource utilization efficiency may be relatively lower. Further, if one of the UEs 115 does not have data to transmit in the AUL subframe, the interlace allocated to the UE 115 may be unused for that AUL subframe when another UE 115 may have been able to use the same resources to transmit data. Accordingly, as described herein, it may be desirable to provide techniques for assigning group-based starting offset values for partial-interlace assigned UEs 115 for AUL transmission. Further, interlace-based LBT is also described herein UEs 115 for partial-interlace assigned UEs 115 for AUL transmission.

Figure 2:
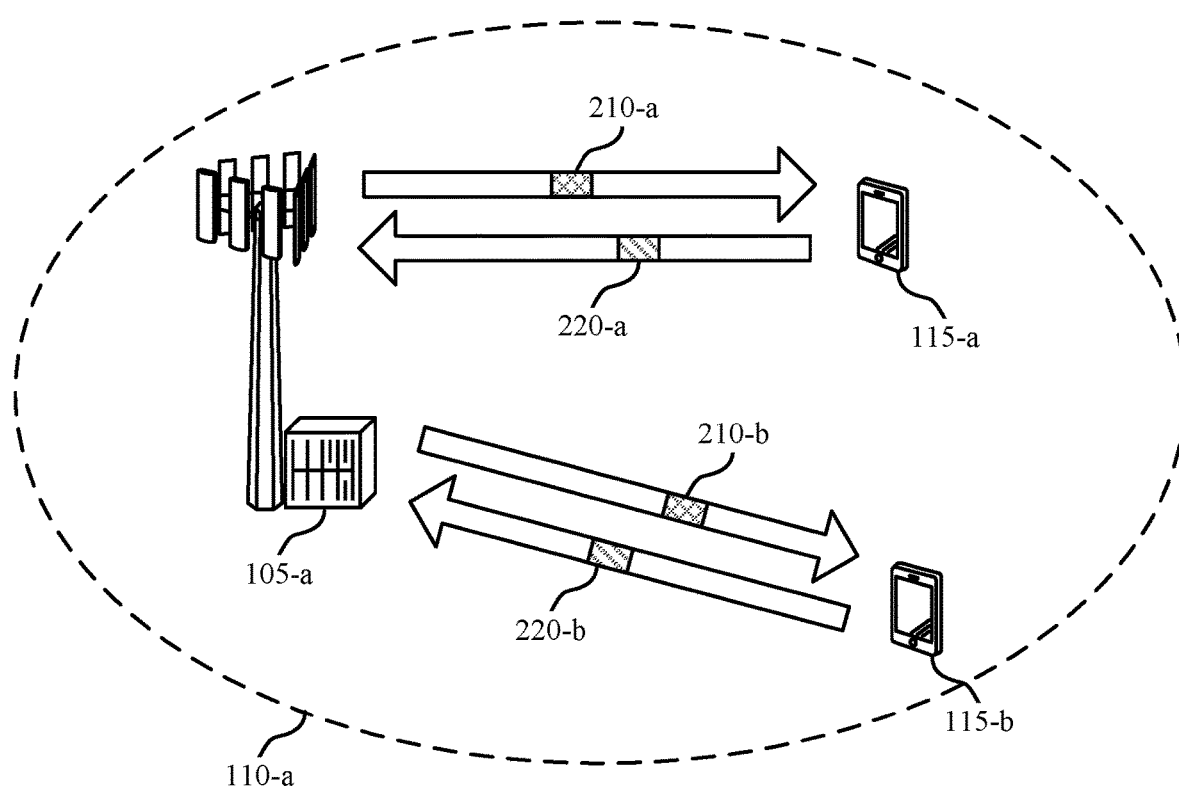
FIG. 2 illustrates an example of a wireless communications system that supports partial-interlace transmission techniques for AUL transmissions in accordance with aspects of the present disclosure.

FIG. 2 illustrates an example of a wireless communications system 200 that supports partial-interlace transmission techniques for AUL transmissions in accordance with aspects of the present disclosure. In some examples, the wireless communications system 200 may implement aspects of wireless communications system 100. In the example of FIG. 2, the wireless communications system 200 may include a base station 105-a, which may be an example of a base station 105 as described with reference to FIG. 1. The wireless communications system 200 may also include a first UE 115-a and a second UE 115-b, which may be examples of a UE 115 as described with reference to FIG. 1, that are located within the geographic coverage area 110-a of the base station 105-a. The first UE 115-a may be one UE 115 of a first group of multiple UEs 115, and the second UE 115-b may be one UE 115 of a second group of multiple UEs 115.

In the example of FIG. 2, the base station 105-a and the first UE 115-a may establish a first connection and the base station 105-a and the second UE 115-b may establish a second connection. On the downlink, the base station 105-a may transmit respective partial bandwidth configurations 210 to each of the UEs 115. On the uplink, each of the UEs 115 may transmit respective partial bandwidth AUL transmissions 220 to the base station 105-a. In some cases, a first partial bandwidth configuration 210-a may provide a configuration for the UE 115-a to use to transmit a first partial bandwidth AUL transmission 220-a. Similarly, a second partial bandwidth configuration 210-b may provide a configuration for the UE 115-b to use to perform a second partial bandwidth AUL transmission 220-b. In some cases, each of the first UE 115-*a* and the second UE 115-*b* may concurrently perform the respective partial bandwidth AUL transmissions 220 via their respective connections.

In some cases, the base station 105-*a* may assign group-based starting offset values for AUL transmissions from UEs 115 located within the geographic coverage area 110-*a*. For example, the base station 105-*a* may transmit the first partial bandwidth configuration 210-*a* to the first UE 115-*a*, where the first partial bandwidth configuration 210-*a* may indicate a first channel interlace and a first portion of a channel bandwidth (i.e., an indication of a partial bandwidth channel) for the first UE 115-*a* to use for AUL transmissions. That is, the base station 105-*a* may indicate to the UE 115-*a* the time and frequency resources that have been allocated to the UE 115-*a* for partial bandwidth transmissions. For instance, the base station 105-*a* may assign a particular interlace (e.g., interlace 0) and a particular range of radio frequency spectrum that the first UE 115-*a* may use for AUL transmissions. The base station 105-*a* may similarly transmit the second partial bandwidth configuration 210-*b* to the second UE 115-*b*, where the second partial bandwidth configuration 210-*b* may indicate a second channel interlace and a second portion of a channel bandwidth for the second UE 115-*b* to use for AUL transmissions. The base station 105-*a* may further transmit to each of the UEs 115 an AUL configuration, where the AUL configuration may include parameters for AUL transmissions, including, for example, a group identifier (e.g., a group ID). In some cases, the base station 105-*a* may transmit the partial bandwidth configurations 210 with the AUL configurations.

One or more of the UEs 115 may determine to transmit a partial bandwidth AUL transmission 220 according to the received partial bandwidth configurations 210 and the AUL configurations. For example, the UE 115-*a* may determine to transmit a partial bandwidth AUL transmission 220-*a* on the first channel interlace and the first portion of the channel bandwidth according to the received partial bandwidth configuration 210-*a*. The UE 115-*a* may then select a starting offset value for the AUL transmission. The starting offset value may correspond to a particular point within an AUL subframe at which the UE 115-*a* is to begin transmitting. In some cases, the UE 115-*a* may select the starting offset value randomly from a set of defined starting offset values for AUL transmissions as a function of the group identifier received from the base station 105-*a* in the AUL configuration. Additionally alternatively, a UE 115 may select the starting offset value as a function of a slot number of the AUL subframe. In some cases, a first set of starting offset values may be defined for AUL transmissions within an MCOT transmission opportunity, and a second set of starting offset values may be defined for AUL transmissions outside of the MCOT transmission opportunity, where the MCOT transmission opportunity may be obtained by the base station 105-*a*. For example, for AUL transmissions within an MCOT transmission opportunity, the set of starting offset values from which the UE 115-*a* may select a value may be: {16 μs, 25 μs, 34 μs, 43 μs, 52 μs, 61 μs, OS #1}, and for AUL transmissions outside of the MCOT transmission opportunity, the set of starting offset values may be {34 μs, 43 μs, 52 μs, 61 μs, OS #1}.

In this way, the base station 105-*a* may group the UEs 115 located within its geographic coverage area 110-*a* into multiple groups, where each group, as identified by its corresponding group identifier, may transmit according to a unique starting offset value. The base station 105-*a* may group the UEs 115 according to their corresponding bandwidth allocation, where each group of UEs 115 includes UEs 115 allocated non-overlapping resources. For example, the first UE 115-*a* and the second UE 115-*b* may both be allocated a first channel interlace and a first portion of a channel bandwidth. In this example, the base station 105-*a* may group the first UE 115-*a* in a first group UEs 115, where the first group of UEs 115 includes a further UE 115 allocated a second channel interlace and a second portion of the channel bandwidth, a further UE 115 allocated a third channel interlace and a third portion of the channel bandwidth, and so on. Similarly, the base station 105-*a* may group the second UE 115-*a* in a second group UEs 115, where the second group of UEs 115 may include one or more UEs each allocated non-overlapping interlaces and channel bandwidths. In some cases, a UE 115 allocated a full channel may be in a "group" of its own.

The base station 105-*a* may signal a first AUL configuration with a first group identifier to each UE 115 of the first group of UEs 115 and a second AUL configuration with a second group identifier the second group of UEs 115. Then, according to the received first and second group identifiers, each UE 115 of the first and second groups of UEs 115 may select a starting offset value from the set of starting offset values, where the selected starting offset values are different from one another. In this way, each UE 115 of the first group of UEs 115 may transmit together at a first time within an AUL subframe according to a first starting offset value, and each UE 115 of the second group of UEs 115 may transmit together at a second time within the AUL subframe according to a second starting offset value. Thus, as each UE 115 of each group is allocated non-overlapping resources within its respective group of UEs 115, no two UEs 115 will block each other by transmitting on the same frequency resources at the same time.

Figure 3:
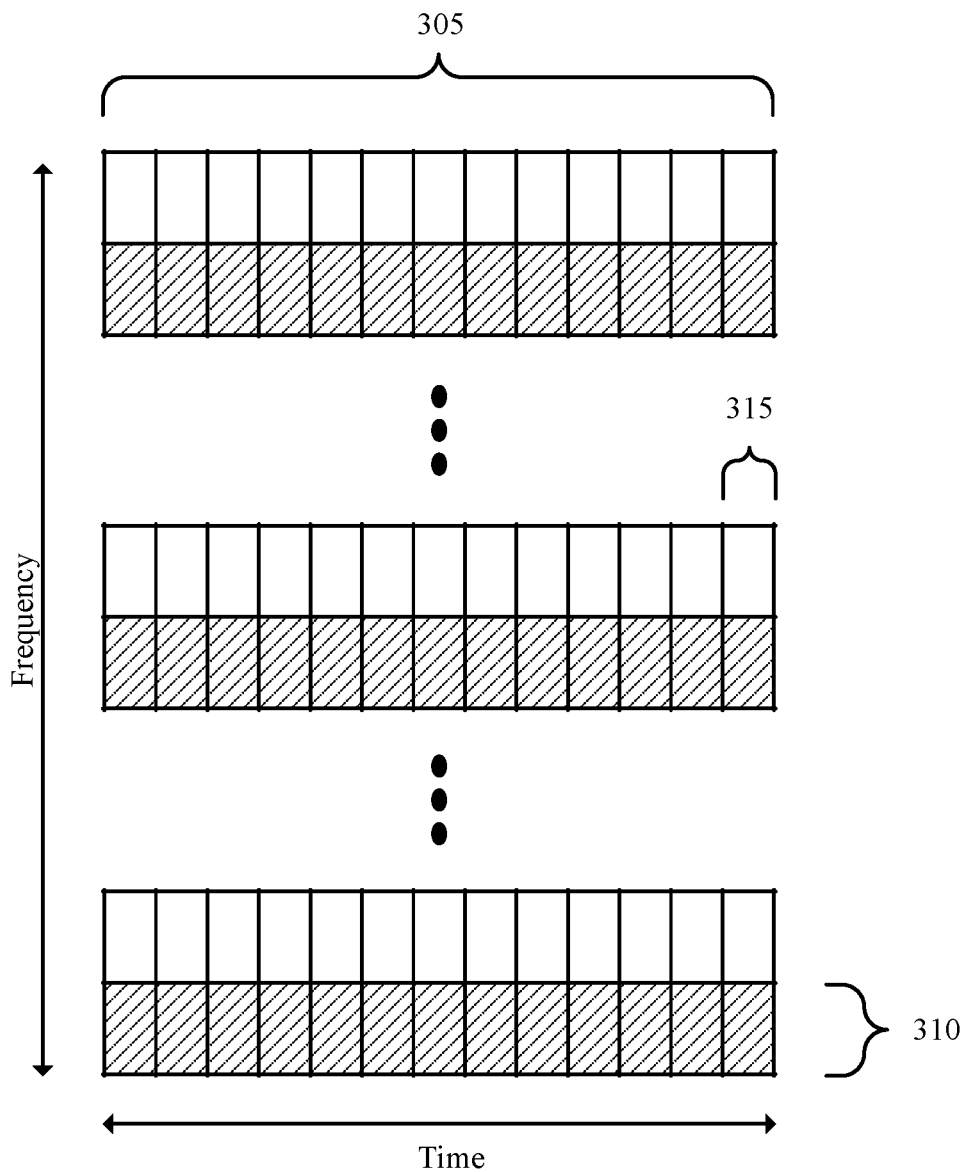
FIG. 3 illustrates an example subframe configuration for a wireless communications system that supports partial-interlace transmission techniques for AUL transmissions in accordance with aspects of the present disclosure.

FIG. 3 illustrates an example subframe configuration 300 for a wireless communications system that supports partial-interlace transmission techniques for AUL transmissions in accordance with aspects of the present disclosure. The example subframe configuration 300 may be an example of the partial bandwidth configurations and resource allocations for groups of UEs 115 for AUL transmissions to a base station 105 as described with reference to FIG. 2.

As shown in the example subframe configuration 300, a radio frequency bandwidth of an AUL subframe 305 may be divided into a one or more interlaces. Each interlace may include one more radio frequency bands 310 each including one or more resource elements 315. In some cases, the radio frequency bands 310 of one interlace may be non-contiguous bands where the radio frequency bands 310 may be spaced in frequency according to a uniform spreading pattern or a non-uniform spreading pattern.

As described with reference to FIG. 2, a partial bandwidth configuration may provide a configuration for a UE 115 to use to transmit a partial bandwidth AUL transmission. The example subframe configuration 300 shows multiple partial bandwidth configurations for multiple groups of UEs 115. Each partial bandwidth configuration may include, for example, an indication of a channel interlace and a portion of a channel bandwidth (i.e., an indication of a partial bandwidth channel) for a respective UE 115 to use for partial bandwidth AUL transmissions. The example subframe configuration shows a first interlace (e.g., interlace 0) and a second interlace (e.g., interlace 1).

A base station 105 may transmit a partial bandwidth configuration to one or more UEs 115 to configure the UEs 115 with a particular interlace. For example, a base station 105 may configure a first UE 115 and a second UE 115 to use the first interlace 320. The base station may configure a third UE 115 and a fourth UE 115 to use the second interlace 325. In this case, a first group may include the first UE 115 and the third UE 115, as they are allocated different non-overlapping resources (i.e., one using the first interlace 320, and the other using the second interlace 325). Similarly, a second group may include the second UE 115 and the fourth UE 115. The base station 105 may additionally transmit an AUL configuration to the UEs 115, the AUL configuration including a group identifier. The first UE 115 and the second UE 115 may randomly select a starting offset value from a set of starting offset values based on their group identifier (i.e., the first group) to determine a starting offset for an AUL transmission (e.g., selecting a random offset value of 34 μs). Similarly the second UE 115 and fourth UE 115 may select a starting offset value based on their group identifier (i.e., the second group) to determine a starting offset for an AUL transmission (e.g., selecting a random offset value of 43 μs).

After completing a channel access procedure (e.g., the interlace-based LBT procedure as described with reference to FIG. 4), if the first UE 115 and the third UE 115 have data to transmit in an AUL transmission, the UEs may transmit according to their determined starting offset of 34 μs. If the first UE 115 and the third UE 115 have data to transmit and accordingly transmit the data. If the first UE 115 and the third UE 115 do not have data to transmit, the second UE 115 and the fourth UE 115 may transmit according to their determined starting offset of 43 μs. Accordingly, the described techniques provide for later groups of UEs 115 to transmit an AUL transmission using the same resources as another group of UEs 115 when the first group may not have had data to transmit, and otherwise would have underutilized the resources.

Figure 4:
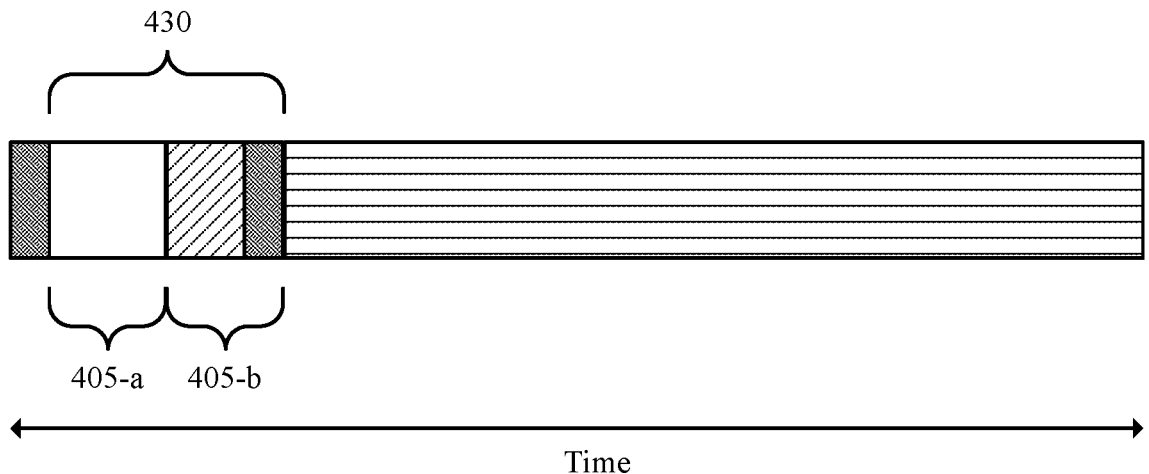
FIG. 4 illustrates an example of a transmission timeline that supports partial-interlace transmission techniques for AUL transmissions in accordance with aspects of the present disclosure.
Figure 4:
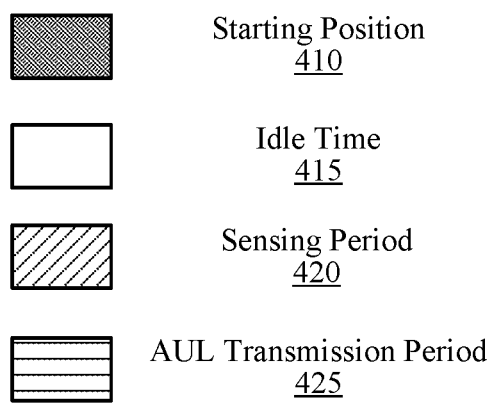

FIG. 4 illustrates an example of a transmission timeline 400 that supports partial-interlace transmission techniques for AUL transmissions in accordance with aspects of the present disclosure. In some examples, the transmission timeline 400 may implement aspects of the wireless communications systems as described with reference to FIGS. 1 and 2, respectively. In some examples, the transmission timeline 400 may be configured according to aspects of the subframe configuration as described with reference to FIG. 3. The transmission timeline 400 illustrates one or more UEs 115 performing a per-interlace LBT procedure before transmitting AUL transmissions. The transmission timeline 400 shows a transmission scheme across a plurality of OFDM symbols 405.

In some cases, assigning group-based starting offset values for partial-interlace assigned UEs 115 for AUL transmission, as described with reference to FIGS. 2 and 3, may provide for relatively increased utilization of the medium when groups of UEs 115 having earlier-assigned starting offset values do not have data to transmit thus allowing later-assigned UEs 115 to utilize the same resources to transmit data. In some such cases, however, a UE 115 in the later-transmitting group may perform a full-bandwidth LBT procedure and detect an earlier-transmitting UE 115 transmitting on a different interlace. However, because the full-bandwidth LBT procedure detects across all interlaces rather than only the interlace on which the UE 115 is to transmit, the transmission of the earlier-transmitting UE 115 may unnecessarily block the later-transmitting UE 115. Thus, in some such cases, it may be beneficial for the later-transmitting UE 115 to perform an LBT procedure in which the UE 115 measures the energy of its assigned interlace so as not to be unnecessarily blocked from transmitting. Accordingly, techniques described herein provide for interlace-based LBT in which a UE 115 may measure the energy of its assigned interlace and compare the measured energy to an energy threshold.

The transmission timeline 400 shows an example transmission scheme for two groups of UEs 115 transmitting and performing an interlace-based LBT procedure. The transmission timeline 400 includes starting positions 410, an idle time 415, a sensing period 420, and an AUL transmission period 425. The starting positions 410 include a first starting position 410 for a first group of UEs 115 and a second starting position 410 for a second group of UEs. Starting with the first starting position 410, the first group of UEs 115 may begin transmitting data if the UEs 115 have data to transmit. Following the first starting position 410, there may be an idle time 415 until, for example, a boundary of the next OFDM symbol 405.

In the next OFDM symbol 405-b, the second group of UEs 115 assigned a later starting offset value for transmitting within a subframe may perform medium sensing based on the group's assigned interlace (i.e., interlace-based LBT). The second group of UEs 115 may perform the medium sensing for the duration of the sensing period 420. Finally, following the starting position 410 for the second group of UEs 115, the first group of UEs 115 and/or the second group of UEs 115 may transmit during the AUL transmission period 425.

Interlace-based LBT may be performed by measuring the energy on its assigned interlace. To measure the energy on the interlace, the UE 115 may collect one or more samples of the given OFDM symbol 405. In some cases, the UE 115 may further perform a fast Fourier transform (FFT) on the measured energy increasing an amount of time for performing energy detection. Thus, in some cases, a base station 105 may allot a relatively larger amount of time to avoid CCA collisions for the starting positions 410 for the interlace-based LBT procedure as compared to a time domain CCA procedure. In some cases, a UE may use a subset of resource elements on an interlace to measure the energy of the interlace. In some cases, for example, a UE 115 may leave some edge resource elements of its allocated interlace specifically for interlace energy detection so as to avoid potential leakage due to potential timing offset or different subcarrier spacings.

In some cases, a starting position 410 for transmission may not be aligned with an boundary of an OFDM symbol 405. For example, as shown in FIG. 4, the second starting position 410 begins during the second OFDM symbol 405-b. In such cases, a UE 115 may transmit a filler signal 430 until the boundary of the OFDM symbol 405. As shown in FIG. 4, the filler signal 430 spans the idle time 415 and the entirety of the second OFDM symbol 405-b. In some cases, to avoid interfering with other UEs 115 due to leakage to adjacent interlaces, the UE 115 may transmit the filler signal 430 with a smaller set of resource elements than all resource elements of the assigned interlace. For instance, the UE 115 may not transmit the filler signal 430 on edge resource elements of its assigned interlace. Additionally or alternatively, if the UE 115 detects low energy on an adjacent interlace, the UE 115 may use an extended cyclic prefix as the filler signal 430, and if the UE 115 detects a high energy on an adjacent interlace, the UE 115 may or may not transmit the filler signal 430 depending on the particular energy level.

In some cases, the described interlace based-LBT procedure may use a relatively longer gap between the first and second starting positions 410. Because of this relatively longer gap, it may be possible for another node (e.g., a Wi-Fi node) to use the medium during the idle time 415 when neither group of UEs 115 is transmitting. To avoid such medium collisions, the UEs 115 in the second group may measure: an interlace energy (E0) on a first symbol (e.g., symbol x0), and a full-bandwidth time-domain energy (E) up to the starting position 410 for the UE 115 (e.g., symbol x2). In some cases, E may be a combination of multiple observations of energy measurement on multiple CCA slots. Assuming that the first group of UEs 115 starts on symbol x0 and the second group of UEs 115 starts on symbol x2, the second group of UEs 115 may use the gap for interlace energy measurement, shown as the sensing period 420 in FIG. 4. A UE 115 of the second group of UEs 115 may transmit if the E0 measurement is less than an energy threshold (e.g., Th1), if there is not a significant energy increase in the time domain energy measurement of E, and if E, or an average (E), is less than a second threshold (e.g., Th3), where Th3 may be a more relaxed threshold than Th1.

In some cases, the described interlace based-LBT techniques may be used for scheduled uplink (SUL) transmissions, as well as potential collision avoidance between SUL transmissions and AUL transmissions. In some cases, multiple UEs 115 may be assigned to transmit on multiple subframes on different interlaces using FDM. Without the described interlace-based LBT techniques, the FDM UEs 115 may each need to check the medium at the same time, otherwise the FDM UEs 115 may block each other in a subsequent subframe even the interfering UE 115 stop transmitting in the subsequent subframe. The described interlace-based LBT techniques, however, may allow the UEs 115 to measure the energy on a per-interlace basis and thus may not be blocked by other UEs transmitting AUL and/or SUL transmissions on other interlaces.

In some cases, the described interlace-based LBT techniques may be used for SUL transmissions, or between AUL transmissions and SUL transmissions where different UEs 115 are assigned different orthogonal interlaces. In some cases, UEs 115 assigned to the same partial interlace may be assigned different starting positions within a SUL subframe. These starting positions may be selected based on a group identifier in a similar manner as described for AUL transmissions, as described with reference to FIG. 2. In this case, the group identifier may be assigned with a SUL grant, or through other configuration signaling. In some cases, a first group may include AUL UEs and a second group may include SUL UEs. In some cases, the SUL UEs may utilize similar energy sensing techniques for per-interlace LBT, as described herein.

The described interlace-based LBT techniques may additionally be used for downlink transmissions. That is, interlace-based LBT may be performed among downlink nodes, as well as between uplink nodes and downlink nodes. In some cases, a base station 105 may transmit on an unused interlace if the base station 105 determines that no other nodes (e.g., other downlink nodes or uplink nodes) are using the given interlace.

Figure 5:
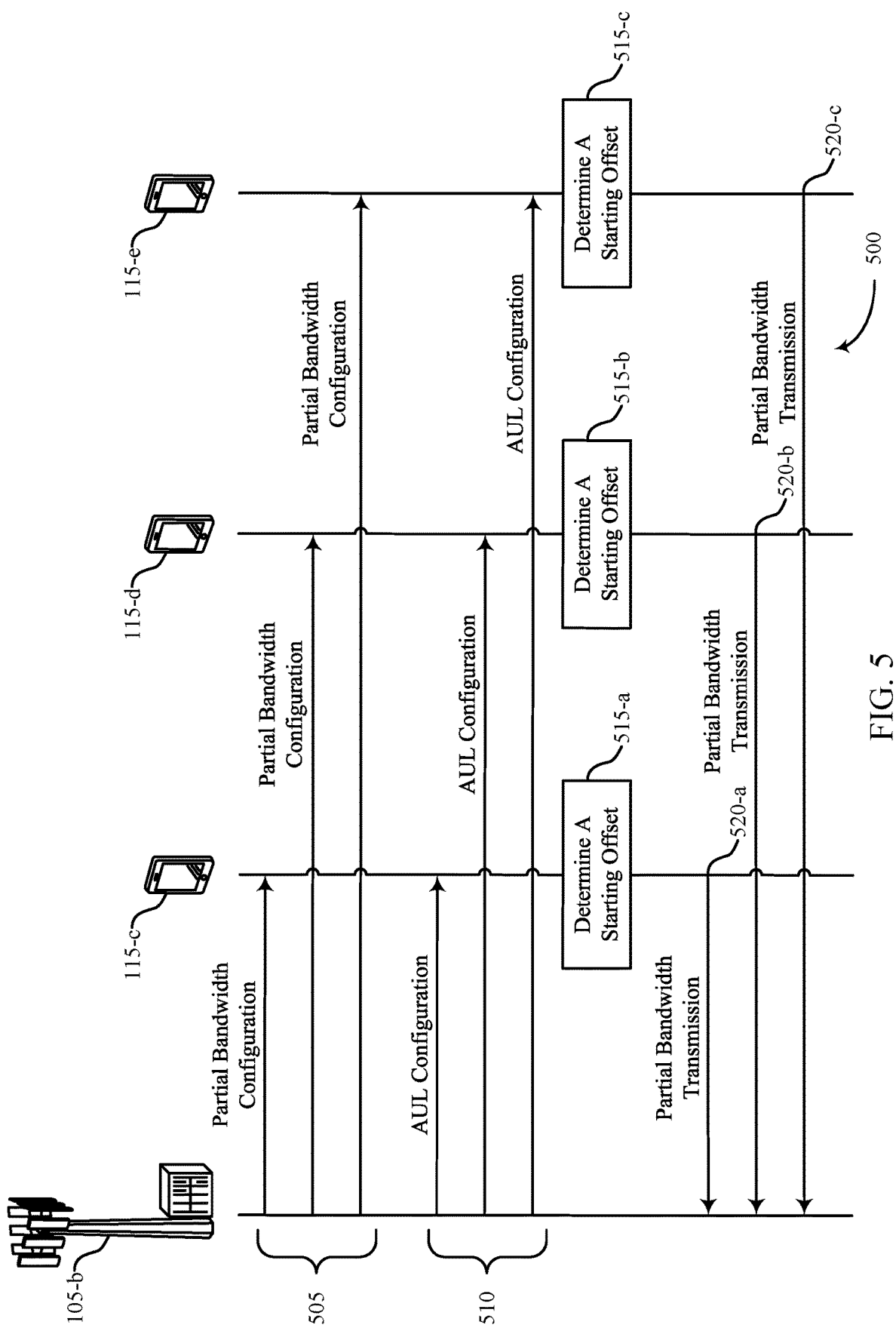
FIGS. 5 and 6 illustrate an example of a process flow in a wireless communications system that supports partial-interlace transmission techniques for AUL transmissions in accordance with aspects of the present disclosure.

FIG. 5 illustrates an example of a process flow 500 in a wireless communications system that supports partial-interlace transmission techniques for AUL transmissions in accordance with aspects of the present disclosure. In some examples, the process flow 500 may implement aspects of the wireless communications system 100. For example, the process flow 500 includes a base station 105-b and UEs 115-c, 115-d, and 115-e that each may be examples of the corresponding devices as described with reference to FIGS. 1 through 4. The process flow 500 may illustrate an example of assigning group-based starting offset values for partial-interlace assigned UEs 115 for AUL transmission. For example, the UE 115-c and the UE 115-d may be assigned to a first group of UEs 115, and the UE 115-e may be assigned to a second group of UEs 115.

At 505, the base station 105-b may transmit partial bandwidth configurations to each of the UEs 115. For example, the base station 105-b may transmit a first partial bandwidth configuration to the UE 115-c, a second partial bandwidth configuration to the UE 115-d, and a third partial bandwidth configuration to the UE 115-d. Each of the UEs 115 may correspondingly receive the partial bandwidth configurations for uplink transmissions. Each of the partial bandwidth configuration may indicate channel interlaces and portions of a channel bandwidth for AUL transmissions. In some cases, the base station 105-b may transmit each of the partial bandwidth configurations to each of the UEs 115 at substantially the same time.

At 510, the base station 105-b may transmit AUL configurations to each of the UEs 115. For example, the base station 105-b may transmit a first AUL configuration to the UE 115-c, a second AUL configuration to the UE 115-d, and a third AUL configuration to the UE 115-d. In some cases, each of the AUL configurations may be based on the partial bandwidth configurations. In some cases, the AUL configurations and partial bandwidth configurations, as described at 505, may be transmitted together, for example, as part of one configuration transmission. Each of the UEs 115 may correspondingly receive the AUL configurations, where the AUL configurations may each include a group identifier. The group identifier may be associated with one or more of the UEs 115 having non-overlapping resource allocations. For example, as the UE 115-c and the UE 115-d are both of the first group of UEs 115 and thus each receive a first group identifier, they may have non-overlapping resource allocations. Similarly, the UE 115-e may receive a second group identifier identify the UE 115-e as belonging to a second group of UEs 115. In some cases, the base station 105-b may transmit each of the AUL configurations to each of the UEs 115 at substantially the same time.

At 515, each of the UEs 115 may determine a starting offset. For example, each UE 115 may determine a starting offset with respect to an AUL subframe for a partial bandwidth transmission based on the group identifiers, as may have been received in the AUL configurations at 510. In some cases, determining the starting offset may include selecting the starting offset from a set of defined starting offset values. In some cases, selecting the starting offset may include randomly selecting the starting offset from the set of defined starting offset values. In some cases, randomly selecting the starting offset may be based on the group identifier for the UE and/or a slot number of the AUL subframe for the partial bandwidth transmission by the UE. In some cases, selecting the starting offset is based on whether the partial bandwidth transmission of the UE is inside of (or conversely, outside of) a MCOT.

At 520-a, the UE 115-c may perform the partial bandwidth transmission according to the starting offset, as may have been determined at 515-a, over the channel interlace and the portion of the channel bandwidth, as may have been received at 505 and 510, respectively. That is, the UE 115-c may transmit to the base station 105-b, and the base station 105-b may receive from the UE 115-c, a first partial bandwidth transmission. The UE 115-c may transmit the first partial bandwidth transmission at a first starting offset with respect to an AUL subframe, where the first starting offset may be based on the group identifier, as may have been received at 510. In some cases, prior to transmitting the partial bandwidth transmission, the UE 115-c may perform a per-interlace LBT procedure by measuring an energy level of at least the portion of the channel interlace based on the partial bandwidth configuration, as may have been received at 505. The UE 115-c may determine an availability of at least the portion of the channel interlace based on the per-interlace LBT procedure, and transmit over the channel interlace based on the determined availability.

At 520-b, the UE 115-d may perform the partial bandwidth transmission according to the starting offset, as may have been determined at 515-b, over the channel interlace and the portion of the channel bandwidth, as may have been received at 505 and 510, respectively. That is, the UE 115-d may transmit to the base station 105-b, and the base station 105-b may receive from the UE 115-d, a second partial bandwidth transmission. The UE 115-d may transmit the second partial bandwidth transmission at the first starting offset with respect to the AUL subframe, where the first starting offset may be based on the group identifier, as may have been received at 510. In some cases, prior to transmitting the partial bandwidth transmission, the UE 115-d may perform a per-interlace LBT procedure by measuring an energy level of at least the portion of the channel interlace based on the partial bandwidth configuration, as may have been received at 505. The UE 115-d may determine an availability of at least the portion of the channel interlace based on the per-interlace LBT procedure, and transmit over the channel interlace based on the determined availability.

At 520-c, the UE 115-e may perform the partial bandwidth transmission according to the starting offset, as may have been determined at 515-c, over the channel interlace and the portion of the channel bandwidth, as may have been received at 505 and 510, respectively. That is, the UE 115-d may transmit to the base station 105-b, and the base station 105-b may receive from the UE 115-e, a third partial bandwidth transmission. The UE 115-e may transmit the third partial bandwidth transmission at a second starting offset with respect to the AUL subframe, where the second starting offset may be based on the group identifier, as may have been received at 510. In some cases, prior to transmitting the partial bandwidth transmission, the UE 115-e may perform a per-interlace LBT procedure by measuring an energy level of at least the portion of the channel interlace based on the partial bandwidth configuration, as may have been received at 505. The UE 115-e may determine an availability of at least the portion of the channel interlace based on the per-interlace LBT procedure, and transmit over the channel interlace based on the determined availability.

Figure 6:
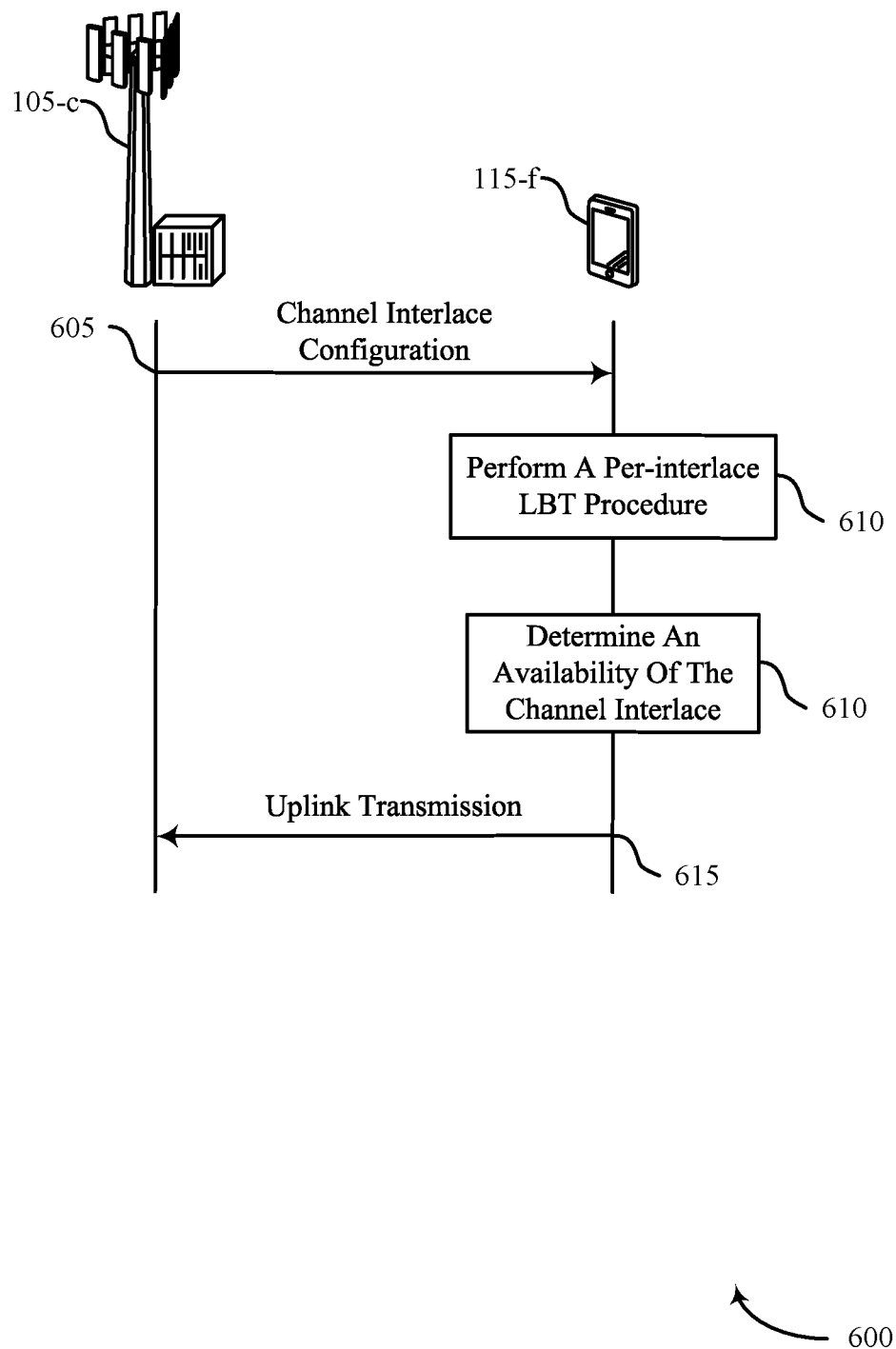

FIG. 6 illustrates an example of a process flow 600 in a wireless communications system that supports partial-interlace transmission techniques for AUL transmissions in accordance with aspects of the present disclosure. In some examples, the process flow 600 may implement aspects of the wireless communications system 100. For example, the process flow 600 includes a base station 105-c and a UEs 115-f that each may be examples of the corresponding devices as described with reference to FIGS. 1 through 5. The process flow 600 may illustrate an example of interlace-based LBT procedures, for example, as described with reference to FIG. 4.

At 605, the base station 105-c may transmit to the UE 115-f, and the UE 115-f may receive from the base station 105-c, a channel interlace configuration for transmissions in a shared radio frequency spectrum band. In some cases, the channel interlace configuration may include a SUL configuration for scheduled transmissions from the UE 115-f to the base station 105-c.

At 610, the UE 115-f may perform a per-interlace LBT procedure by measuring an energy level of at least a portion of a channel interlace of the shared radio frequency spectrum band based on the received channel interlace configuration. In some cases, performing the per-interlace LBT procedure may include measuring the energy level of a subset of REs of the portion of the channel interlace. In some cases, the UE 115-f may performing a FFT on the measured energy level of at least the portion of the channel interlace. In some cases, the UE 115-f may receive an indication of a starting symbol (e.g., an OFDM symbol). In some cases, the UE 115-f may transmit a filler signal following the per-interlace LBT procedure and prior to the indicated starting OFDM symbol based on a result of the per-interlace LBT procedure. In some cases, the filler signal may be transmitted using a subset of REs of the portion of the channel interlace. In some cases, the filler signal may be an extended cyclic prefix. Additionally or alternatively, the UE 115-f may perform a full-interlace LBT procedure by measuring an energy level of a full-channel interlace of the shared radio frequency spectrum band.

At 615, the UE 115-f may determine an availability of the channel interlace based on the per-interlace LBT procedure. In some cases, the UE 115-f may determine an energy level of a second channel interlace adjacent to the channel interlace, where the filler signal may be transmitted based on the energy level of the second channel interlace At 620, the UE 115-f may transmit to the base station 105-c, and the base station 105-c may receive from the UE 115-f, an uplink transmission (e.g., an AUL transmission) over the channel interlace based on the availability of the channel interlace, as may have been determined at 615.

Figure 7:
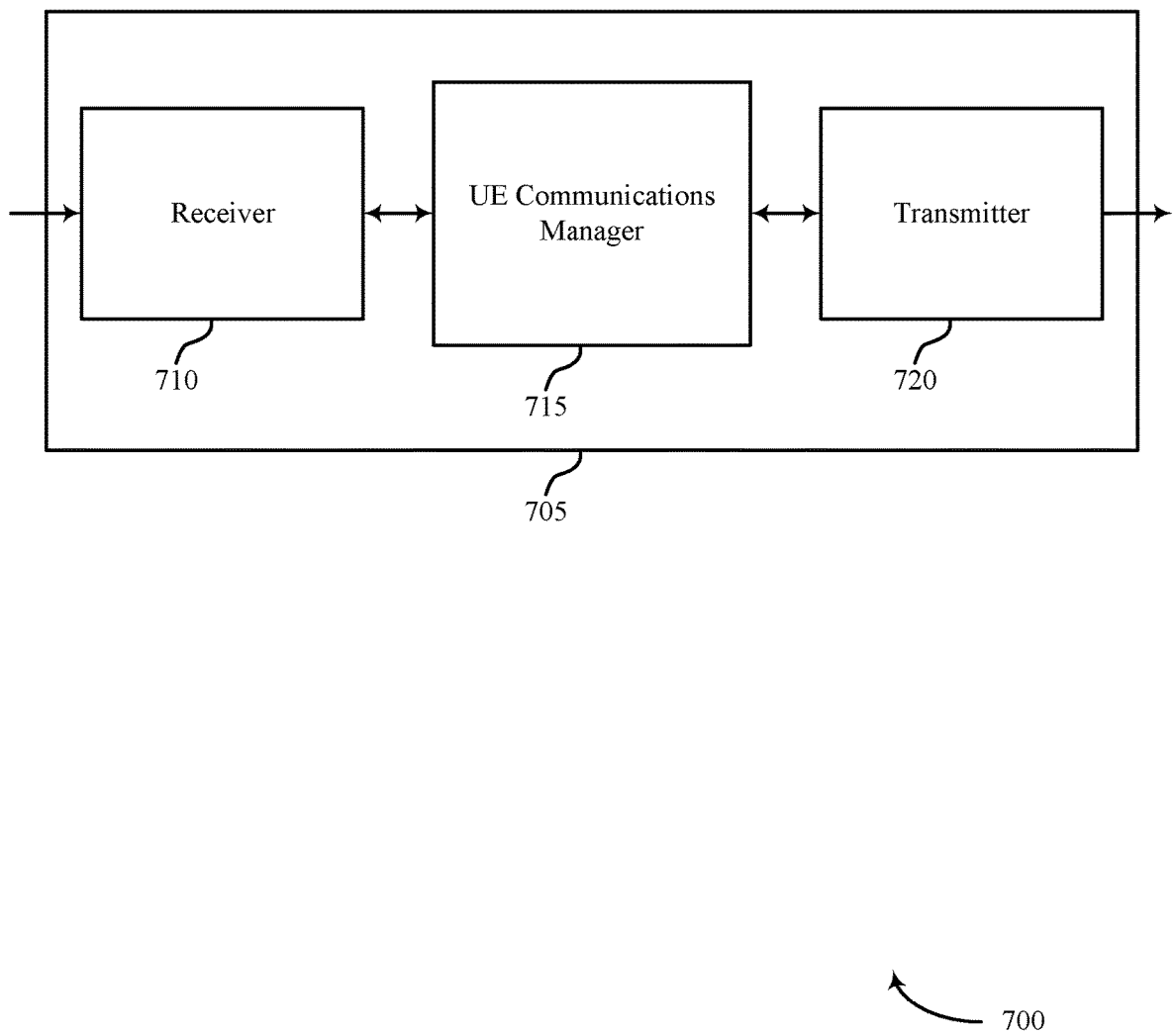
FIGS. 7 and 8 show block diagrams of a wireless devices that support partial-interlace transmission techniques for AUL transmissions in accordance with aspects of the present disclosure.

FIG. 7 shows a block diagram 700 of a wireless device 705 that supports partial-interlace transmission techniques for AUL transmissions in accordance with aspects of the present disclosure. The wireless device 705 may be an example of aspects of a UE 115 as described with reference to FIGS. 2 through 6. The wireless device 705 may include a receiver 710, a UE communications manager 715, and a transmitter 720. The wireless device 705 may also include a processor. Each of these components may be in communication with one another (e.g., via one or more buses).

The receiver 710 may receive information such as packets, user data, or control information associated with various information channels (e.g., control channels, data channels, and information related to partial-interlace transmission for AUL transmissions, etc.). Information may be passed on to other components of the device. The receiver 710 may be an example of aspects of the transceiver 1035 as described with reference to FIG. 10. The receiver 710 may utilize a single antenna or a set of antennas.

The UE communications manager 715 may be an example of aspects of the UE communications manager 1015 as described with reference to FIG. 10. The UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, the UE communications manager 715 and/or at least some of its various sub-components may be a separate and distinct component in accordance with aspects of the present disclosure. In other examples, the UE communications manager 715 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

The UE communications manager 715 may receive a partial bandwidth configuration for uplink transmissions by the UE where the partial bandwidth configuration may indicate a channel interlace and a portion of a channel bandwidth. The UE communications manager 715 may receive an AUL configuration including a group identifier. The UE communications manager 715 may determine a starting offset with respect to an AUL subframe for a partial bandwidth transmission by the UE based on the group identifier. The UE communications manager 715 may perform the partial bandwidth transmission according to the determined starting offset over the channel interlace and the portion of the channel bandwidth.

The transmitter 720 may transmit signals generated by other components of the device. In some examples, the transmitter 720 may be collocated with a receiver 710 in a transceiver module. For example, the transmitter 720 may be an example of aspects of the transceiver 1035 as described with reference to FIG. 10. The transmitter 720 may utilize a single antenna or a set of antennas.

Figure 8:
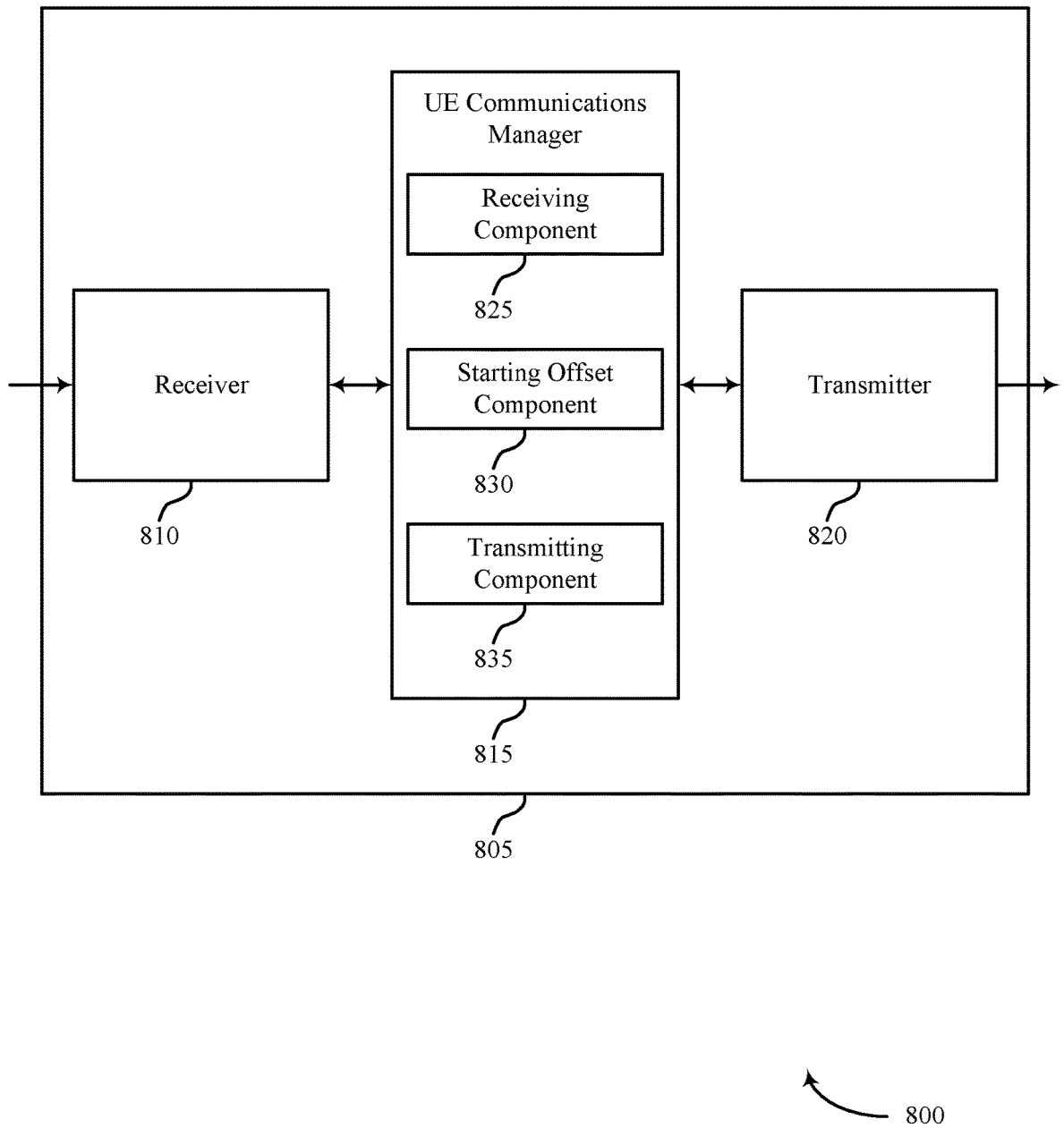

FIG. 8 shows a block diagram 800 of a wireless device 805 that supports partial-interlace transmission techniques for AUL transmissions in accordance with aspects of the present disclosure. The wireless device 805 may be an example of aspects of a wireless device 705 or a UE 115 as described with reference to FIG. 2-7. The wireless device 805 may include a receiver 810, a UE communications manager 815, and a transmitter 820. The wireless device 805 may also include a processor. Each of these components may be in communication with one another (e.g., via one or more buses).

The receiver 810 may receive information such as packets, user data, or control information associated with various information channels (e.g., control channels, data channels, and information related to partial-interlace transmission for AUL transmissions, etc.). Information may be passed on to other components of the device. The receiver 810 may be an example of aspects of the transceiver 1035 as described with reference to FIG. 10. The receiver 810 may utilize a single antenna or a set of antennas.

The UE communications manager 815 may be an example of aspects of the UE communications manager 1015 as described with reference to FIG. 10. The UE communications manager 815 may also include receiving component 825, starting offset component 830, and transmitting component 835.

The receiving component 825 may receive a partial bandwidth configuration for uplink transmissions by the UE, where the partial bandwidth configuration may indicate a channel interlace and a portion of a channel bandwidth and receive an AUL configuration, where the AUL configuration may include a group identifier. In some cases, the group identifier may be associated with one or more UEs having non-overlapping resource allocations.

The starting offset component 830 may determine a starting offset with respect to an AUL subframe for a partial bandwidth transmission by the UE based on the group identifier. In some cases, the determining the starting offset includes selecting the starting offset from a set of defined starting offset values. In some cases, selecting the starting offset may include randomly selecting the starting offset from the set of defined starting offset values. In some cases, randomly selecting the starting offset may be based on the group identifier for the UE or a slot number of the AUL subframe for the partial bandwidth transmission by the UE. In some cases, selecting the starting offset may be based on whether the partial bandwidth transmission of the UE is inside of a MCOT.

The transmitting component 835 may perform the partial bandwidth transmission according to the determined starting offset over the channel interlace and the portion of the channel bandwidth and transmit over the channel interlace based on the determined availability.

Transmitter 820 may transmit signals generated by other components of the device. In some examples, the transmitter 820 may be collocated with a receiver 810 in a transceiver module. For example, the transmitter 820 may be an example of aspects of the transceiver 1035 as described with reference to FIG. 10. The transmitter 820 may utilize a single antenna or a set of antennas.

Figure 9:
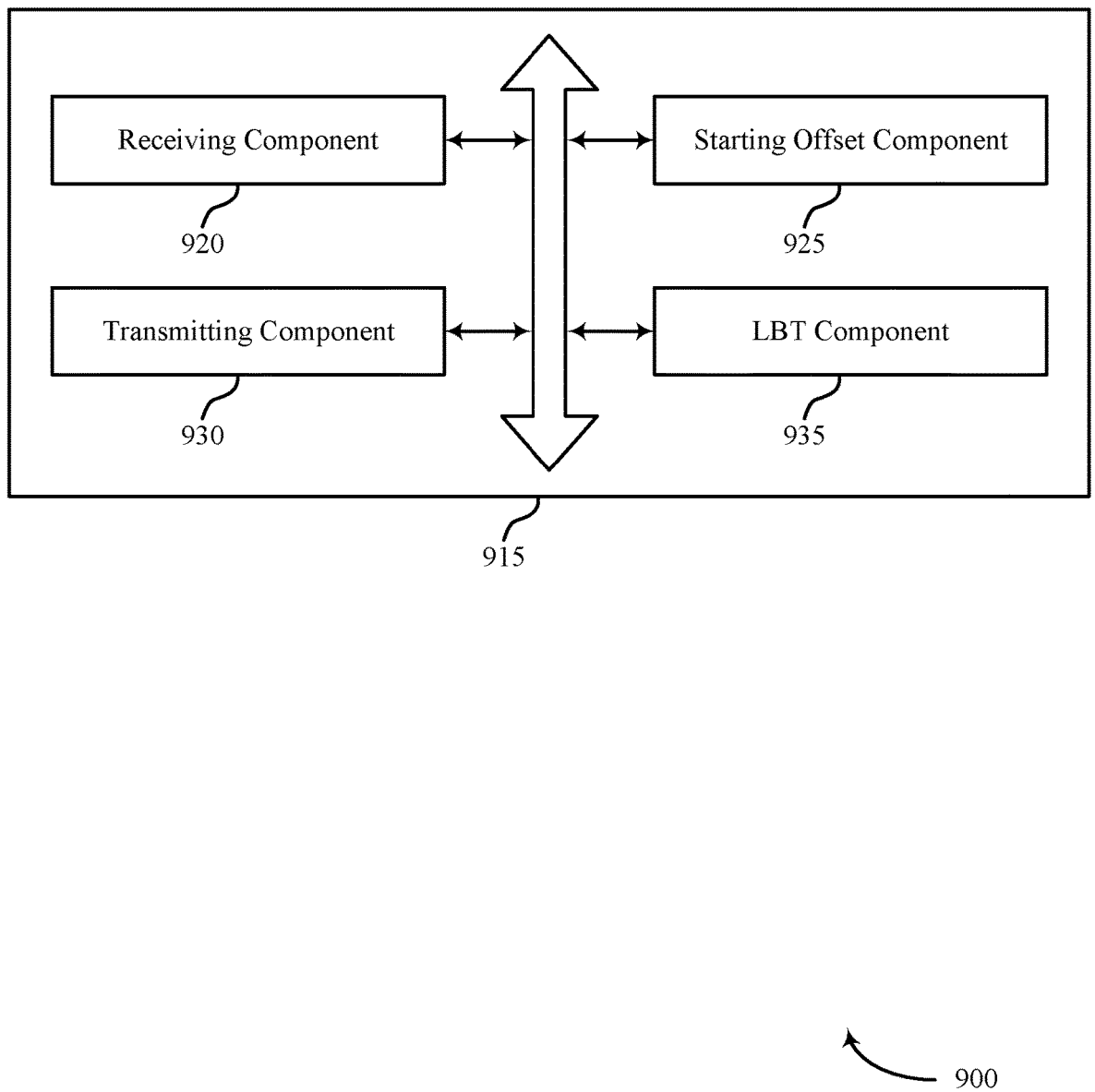
FIG. 9 shows a block diagram of a user equipment (UE) communications manager that supports partial-interlace transmission techniques for AUL transmissions in accordance with aspects of the present disclosure.

FIG. 9 shows a block diagram 900 of a UE communications manager 915 that supports partial-interlace transmission techniques for AUL transmissions in accordance with aspects of the present disclosure. The UE communications manager 915 may be an example of aspects of a UE communications manager as described with reference to FIGS. 7, 8, and 10. The UE communications manager 915 may include a receiving component 920, a starting offset component 925, a transmitting component 930, and a LBT component 935. Each of these modules may communicate, directly or indirectly, with one another (e.g., via one or more buses).

The receiving component 920 may receive a partial bandwidth configuration for uplink transmissions by the UE, the partial bandwidth configuration indicating a channel interlace and a portion of a channel bandwidth and receive an AUL configuration where the AUL configuration may include a group identifier. In some cases, the group identifier may be associated with one or more UEs having non-overlapping resource allocations.

The starting offset component 925 may determine a starting offset with respect to an AUL subframe for a partial bandwidth transmission by the UE based on the group identifier. In some cases, the determining the starting offset may include selecting the starting offset from a set of defined starting offset values. In some cases, selecting the starting offset may include randomly selecting the starting offset from the set of defined starting offset values. In some cases, randomly selecting the starting offset may be based on the group identifier for the UE or a slot number of the AUL subframe for the partial bandwidth transmission by the UE. In some cases, selecting the starting offset may be based on whether the partial bandwidth transmission of the UE is inside of a MCOT.

The transmitting component 930 may perform the partial bandwidth transmission according to the determined starting offset over the channel interlace and the portion of the channel bandwidth and transmit over the channel interlace based on the determined availability.

In some cases, the LBT component 935 may perform a per-interlace LBT procedure by measuring an energy level of at least the portion of the channel interlace based on the received partial bandwidth configuration and determine an availability of at least the portion of the channel interlace based on the per-interlace LBT procedure.

Figure 10:
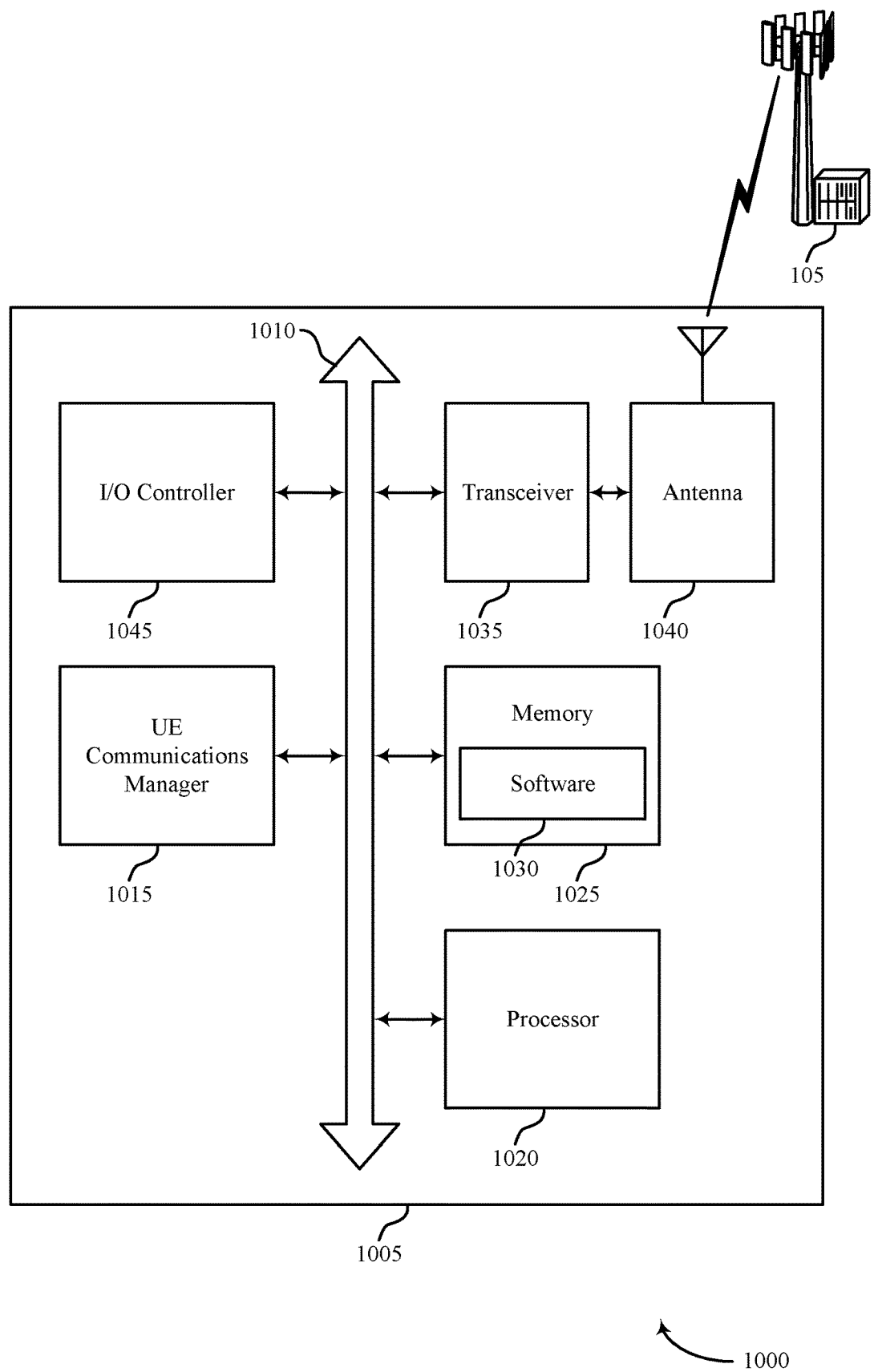
FIG. 10 shows a diagram of a wireless communications system including a wireless device that supports partial-interlace transmission techniques for AUL transmissions in accordance with aspects of the present disclosure.

FIG. 10 shows a diagram of a wireless communications system 1000 including a wireless device 1005 that supports partial-interlace transmission techniques for AUL transmissions in accordance with aspects of the present disclosure. The wireless device 1005 may be an example of or include the components of a wireless device 705, a wireless device 805, or a UE 115 as described above, for example, with reference to FIGS. 7 and 8. The wireless device 1005 may include components for bi-directional voice and data communications including components for transmitting and receiving communications, including a UE communications manager 1015, a processor 1020, a memory 1025, a software 1030, a transceiver 1035, an antenna 1040, and an I/O controller 1045. These components may be in electronic communication via one or more buses (e.g., bus 1010). The wireless device 1005 may communicate wirelessly with one or more base stations 105.

The processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1020 may be configured to operate a memory array using a memory controller. In other cases, a memory controller may be integrated into the processor 1020. The processor 1020 may be configured to execute computer-readable instructions stored in a memory to perform various functions (e.g., functions or tasks supporting partial-interlace transmission for AUL transmissions).

The memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

The software 1030 may include code to implement aspects of the present disclosure, including code to support partial-interlace transmission techniques for AUL transmissions. The software 1030 may be stored in a non-transitory computer-readable medium such as system memory or other memory. In some cases, the software 1030 may not be directly executable by the processor but may cause a computer (e.g., when compiled and executed) to perform functions described herein.

The transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

The I/O controller 1045 may manage input and output signals for the wireless device 1005. The I/O controller 1045 may also manage peripherals not integrated into the wireless device 1005. In some cases, the I/O controller 1045 may represent a physical connection or port to an external peripheral. In some cases, the I/O controller 1045 may utilize an operating system such as iOS®, ANDROID®, MS-DOS®, MS-WINDOWS®, OS/2®, UNIX®, LINUX®, or another known operating system. In other cases, the I/O controller 1045 may represent or interact with a modem, a keyboard, a mouse, a touchscreen, or a similar device. In some cases, the I/O controller 1045 may be implemented as part of a processor. In some cases, a user may interact with the wireless device 1005 via the I/O controller 1045 or via hardware components controlled by the I/O controller 1045.

Figure 11:
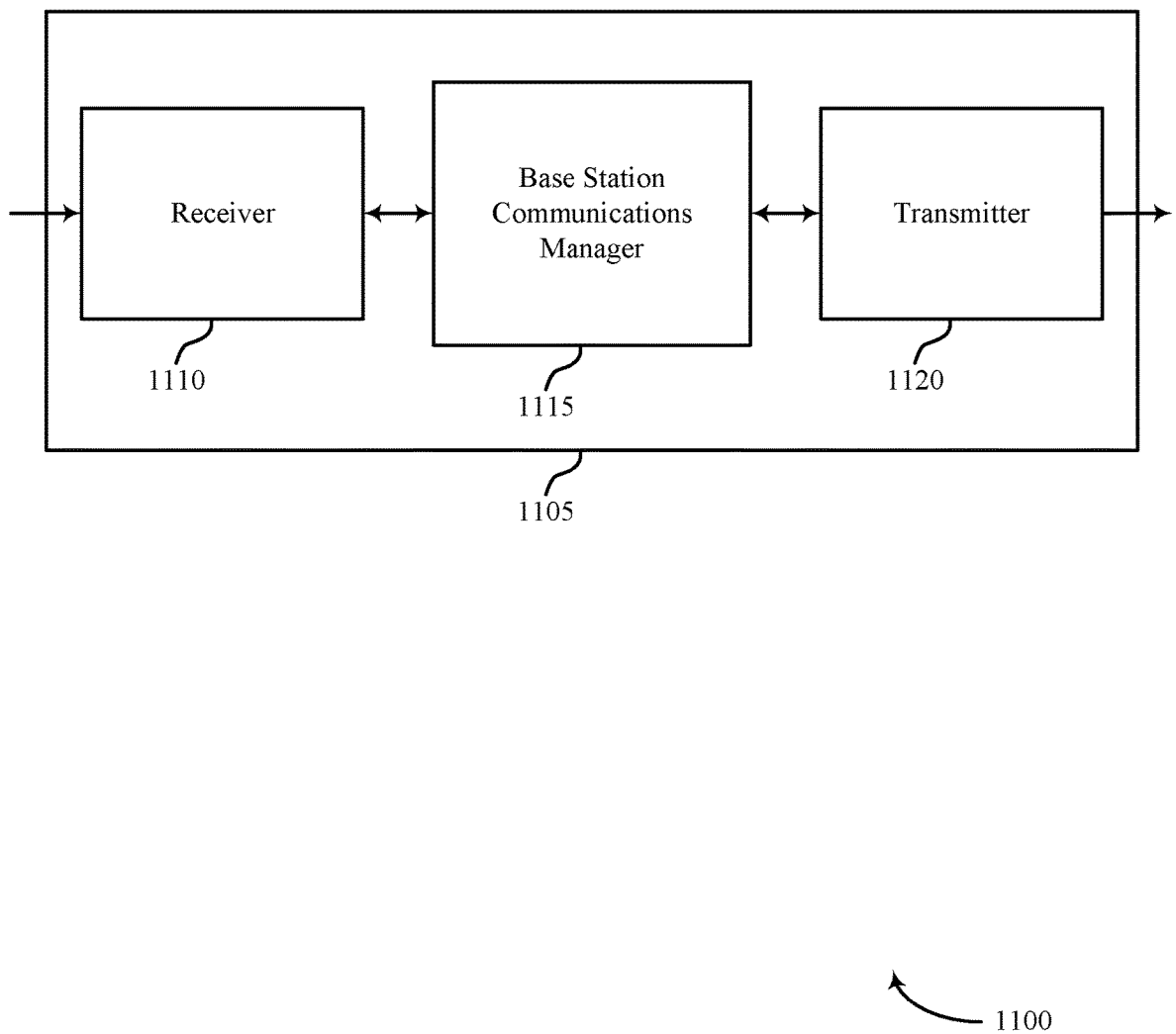
FIGS. 11 and 12 show block diagrams of wireless devices that support partial-interlace transmission techniques for AUL transmissions in accordance with aspects of the present disclosure.

FIG. 11 shows a block diagram 1100 of a wireless device 1105 that supports partial-interlace transmission techniques for AUL transmissions in accordance with aspects of the present disclosure. The wireless device 1105 may be an example of aspects of a base station 105 as described herein. The wireless device 1105 may include a receiver 1110, a base station communications manager 1115, and a transmitter 1120. The wireless device 1105 may also include a processor. Each of these components may be in communication with one another (e.g., via one or more buses).

The receiver 1110 may receive information such as packets, user data, or control information associated with various information channels (e.g., control channels, data channels, and information related to partial-interlace transmission for AUL transmissions, etc.). Information may be passed on to other components of the device. The receiver 1110 may be an example of aspects of the transceiver 1435 as described with reference to FIG. 14. The receiver 1110 may utilize a single antenna or a set of antennas.

The base station communications manager 1115 may be an example of aspects of the base station communications manager 1415 as described with reference to FIG. 14. The base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, the base station communications manager 1115 and/or at least some of its various sub-components may be a separate and distinct component in accordance with aspects of the present disclosure. In other examples, the base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

The base station communications manager 1115 may transmit, to a first UE of a first group of one or more UEs, a first partial bandwidth configuration, the first partial bandwidth configuration indicating a first channel interlace and a first portion of a channel bandwidth, transmit to the first UE a first AUL configuration including a first group identifier, and receive a first partial bandwidth transmission from the first UE at a first starting offset with respect to an AUL subframe, where the first starting offset is based on the first group identifier.

The transmitter 1120 may transmit signals generated by other components of the device. In some examples, the transmitter 1120 may be collocated with a receiver 1110 in a transceiver module. For example, the transmitter 1120 may be an example of aspects of the transceiver 1435 as described with reference to FIG. 14. The transmitter 1120 may utilize a single antenna or a set of antennas.

Figure 12:
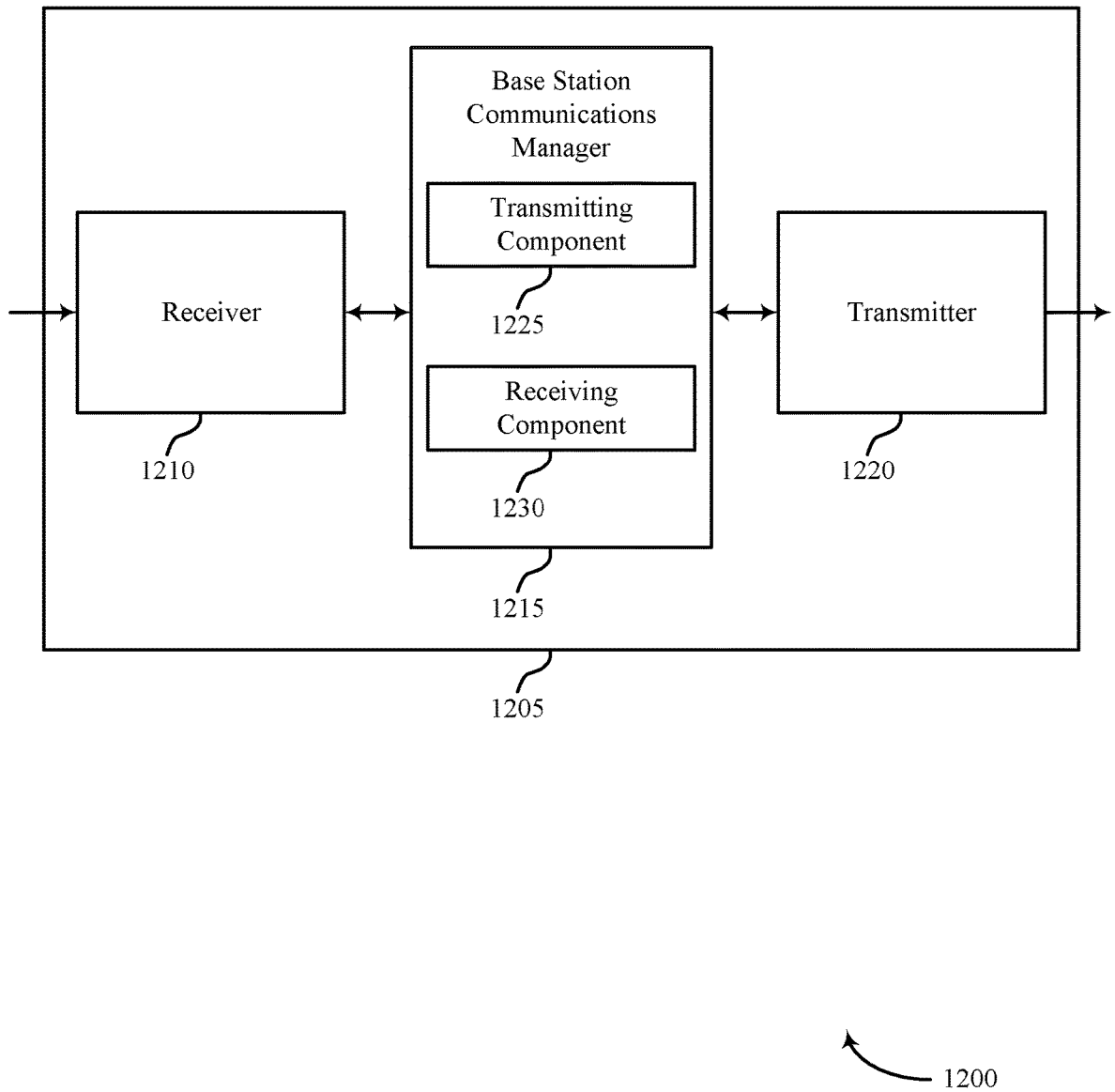

FIG. 12 shows a block diagram 1200 of a wireless device 1205 that supports partial-interlace transmission techniques for AUL transmissions in accordance with aspects of the present disclosure. The wireless device 1205 may be an example of aspects of a wireless device 1105 or a base station 105 as described with reference to FIG. 11. The wireless device 1205 may include a receiver 1210, a base station communications manager 1215, and a transmitter 1220. The wireless device 1205 may also include a processor. Each of these components may be in communication with one another (e.g., via one or more buses).

The receiver 1210 may receive information such as packets, user data, or control information associated with various information channels (e.g., control channels, data channels, and information related to partial-interlace transmission for AUL transmissions, etc.). Information may be passed on to other components of the device. The receiver 1210 may be an example of aspects of the transceiver 1435 as described with reference to FIG. 14. The receiver 1210 may utilize a single antenna or a set of antennas.

The base station communications manager 1215 may be an example of aspects of the base station communications manager 1415 as described with reference to FIG. 14. The base station communications manager 1215 may also include a transmitting component 1225 and a receiving component 1230.

The transmitting component 1225 may transmit, to a first UE of a first group of one or more UEs, a first partial bandwidth configuration. The first partial bandwidth configuration may indicate a first channel interlace and a first portion of a channel bandwidth. The transmitting component 1225 may transmit to a second UE a second partial bandwidth configuration, where the second partial bandwidth configuration may indicate a second channel interlace. In some cases, the second partial bandwidth transmission may be received over the second channel interlace and the first portion of the channel bandwidth. In some cases, the transmitting component 1225 may transmit to the first UE a first AUL configuration including a first group identifier. In some cases, the transmitting component 1225 may transmit a second AUL configuration to the second UE, where the second AUL configuration may include the first group identifier.

The receiving component 1230 may receive a first partial bandwidth transmission from the first UE at a first starting offset with respect to an AUL subframe, where the first starting offset may be based on the first group identifier. In some cases, the receiving component 1230 may receive a second partial bandwidth transmission from a second UE of the first group of one or more UEs where the second partial bandwidth transmission may be received at the first starting offset with respect to the AUL subframe. In some cases, the receiving component 1230 may receive a second partial bandwidth transmission from a second UE of a second group of one or more UEs where the second partial bandwidth transmission may be received at a second starting offset with respect to the AUL subframe. In some cases, the transmitting component 1225 may transmit to the second UE a second AUL configuration including a second group identifier for the second UE, where the second starting offset may be based on the second group identifier.

The transmitter 1220 may transmit signals generated by other components of the device. In some examples, the transmitter 1220 may be collocated with a receiver 1210 in a transceiver module. For example, the transmitter 1220 may be an example of aspects of the transceiver 1435 as described with reference to FIG. 14. The transmitter 1220 may utilize a single antenna or a set of antennas.

Figure 13:
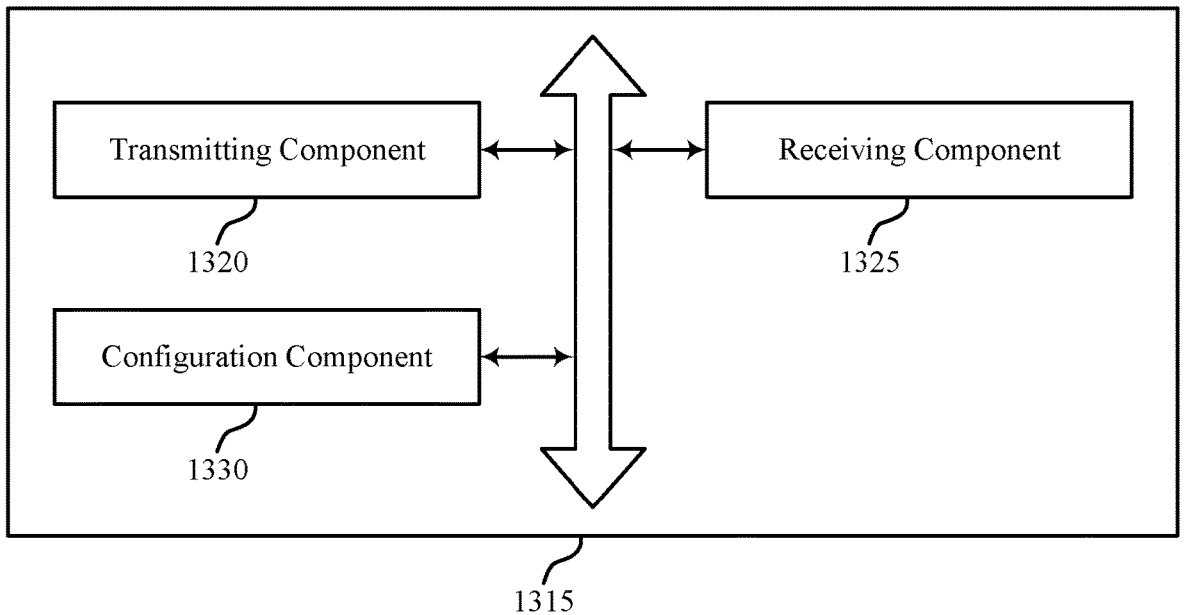
FIG. 13 shows a block diagram of a base station communications manager that supports partial-interlace transmission techniques for AUL transmissions in accordance with aspects of the present disclosure.

FIG. 13 shows a block diagram 1300 of a base station communications manager 1315 that supports partial-interlace transmission techniques for AUL transmissions in accordance with aspects of the present disclosure. The base station communications manager 1315 may be an example of aspects of a base station communications manager 1415 described with reference to FIGS. 11, 12, and 14. The base station communications manager 1315 may include a transmitting component 1320, a receiving component 1325, and a configuration component 1330. Each of these modules may communicate, directly or indirectly, with one another (e.g., via one or more buses).

The transmitting component 1320 may transmit, to a first UE of a first group of one or more UEs, a first partial bandwidth configuration, the first partial bandwidth configuration indicating a first channel interlace and a first portion of a channel bandwidth. In some cases, the transmitting component 1320 may transmit to the second UE a second partial bandwidth configuration, where the second partial bandwidth configuration may indicate a second channel interlace. In some cases, the second partial bandwidth transmission may be received over the second channel interlace and the first portion of the channel bandwidth. In some cases, the transmitting component 1320 may transmit to the first UE a first AUL configuration including a first group identifier. In some cases, the transmitting component 1320 may transmit a second AUL configuration to the second UE where the second AUL configuration may include the first group identifier. In some cases, the transmitting component 1320 may transmit to the second UE a second AUL configuration including a second group identifier for the second UE.

The receiving component 1325 may receive a first partial bandwidth transmission from the first UE at a first starting offset with respect to an AUL subframe, where the first starting offset may be based on the first group identifier. In some cases, the receiving component 1325 may receive a second partial bandwidth transmission from a second UE of the first group of one or more UEs, where the second partial bandwidth transmission may be received at the first starting offset with respect to the AUL subframe, In some cases, the receiving component 1325 may receive a second partial bandwidth transmission from a second UE of a second group of one or more UEs, where the second partial bandwidth transmission may be received at a second starting offset with respect to the AUL subframe. In some cases, the second starting offset may be based on the second group identifier.

The configuration component 1330 may determine the first AUL configuration based on the first partial bandwidth configuration. In some cases, the first starting offset may be from a set of defined starting offset values. In some cases, the first group of one or more UEs may include UEs assigned to non-overlapping channel interlaces.

Figure 14:
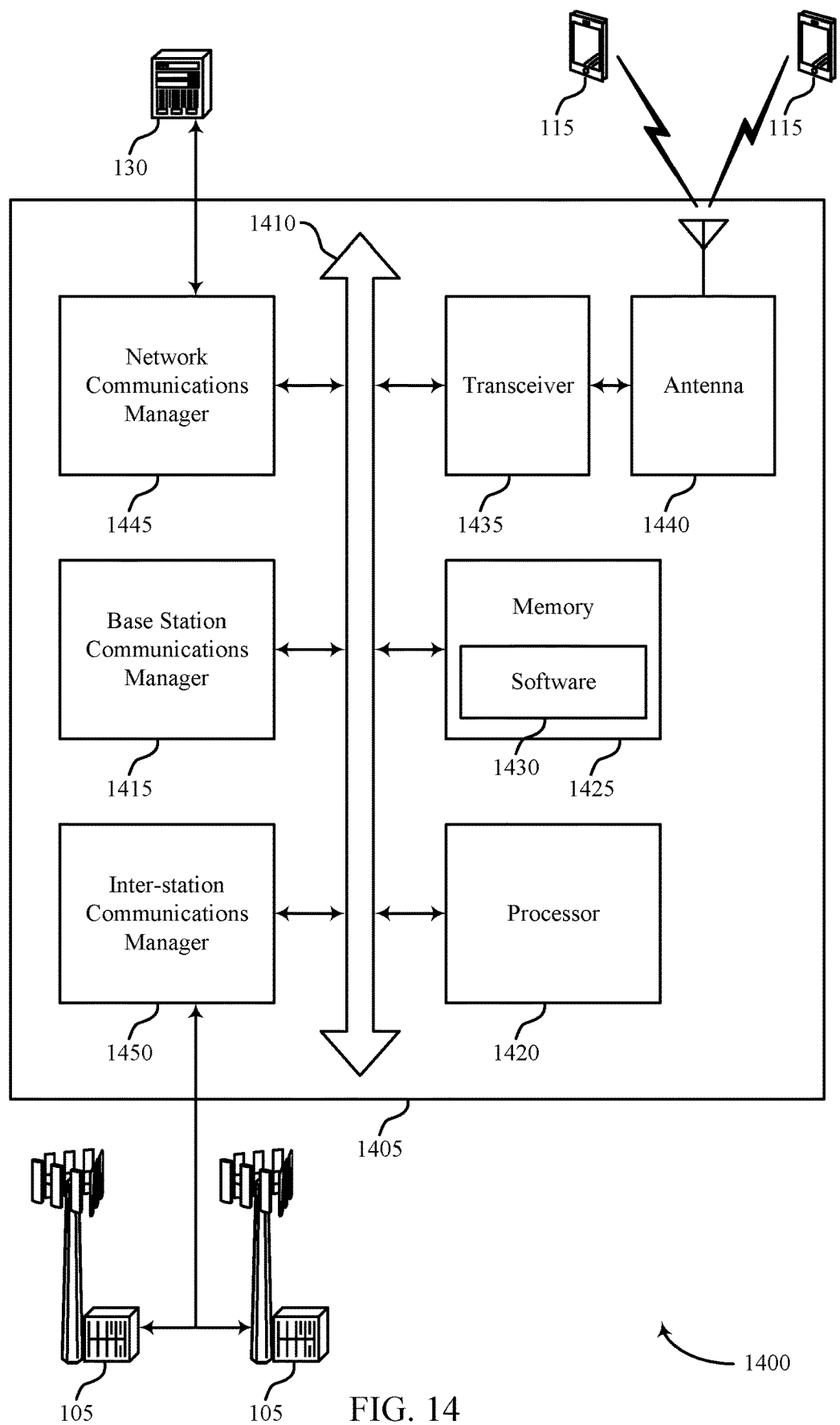
FIG. 14 shows a block diagram of a wireless communications system including a wireless device that supports partial-interlace transmission techniques for AUL transmissions in accordance with aspects of the present disclosure.

FIG. 14 shows a diagram of a wireless communications system 1400 including a wireless device 1405 that supports partial-interlace transmission techniques for AUL transmissions in accordance with aspects of the present disclosure. The wireless device 1405 may be an example of or include the components of base station 105 as described, for example, with reference to FIG. 1. The wireless device 1405 may include components for bi-directional voice and data communications including components for transmitting and receiving communications, including a base station communications manager 1415, a processor 1420, a memory 1425, a software 1430, a transceiver 1435, an antenna 1440, a network communications manager 1445, and an inter-station communications manager 1450. These components may be in electronic communication via one or more buses (e.g., bus 1410). The wireless device 1405 may communicate wirelessly with one or more UEs 115.

The processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1420 may be configured to operate a memory array using a memory controller. In other cases, a memory controller may be integrated into the processor 1420. The processor 1420 may be configured to execute computer-readable instructions stored in a memory to perform various functions (e.g., functions or tasks supporting partial-interlace transmission for AUL transmissions).

The memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

The software 1430 may include code to implement aspects of the present disclosure, including code to support partial-interlace transmission techniques for AUL transmissions. The software 1430 may be stored in a non-transitory computer-readable medium such as system memory or other memory. In some cases, the software 1430 may not be directly executable by the processor but may cause a computer (e.g., when compiled and executed) to perform functions described herein.

The transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

The network communications manager 1445 may manage communications with the core network (e.g., via one or more wired backhaul links). For example, the network communications manager 1445 may manage the transfer of data communications for client devices, such as one or more UEs 115.

The inter-station communications manager 1450 may manage communications with other base station 105, and may include a controller or scheduler for controlling communications with the UEs 115 in cooperation with other base stations 105. For example, the inter-station communications manager 1450 may coordinate scheduling for transmissions to the UEs 115 for various interference mitigation techniques such as beamforming or joint transmission. In some examples, the inter-station communications manager 1450 may provide an X2 interface within an LTE/LTE-A wireless communications network technology to provide communication between base stations 105.

Figure 15:
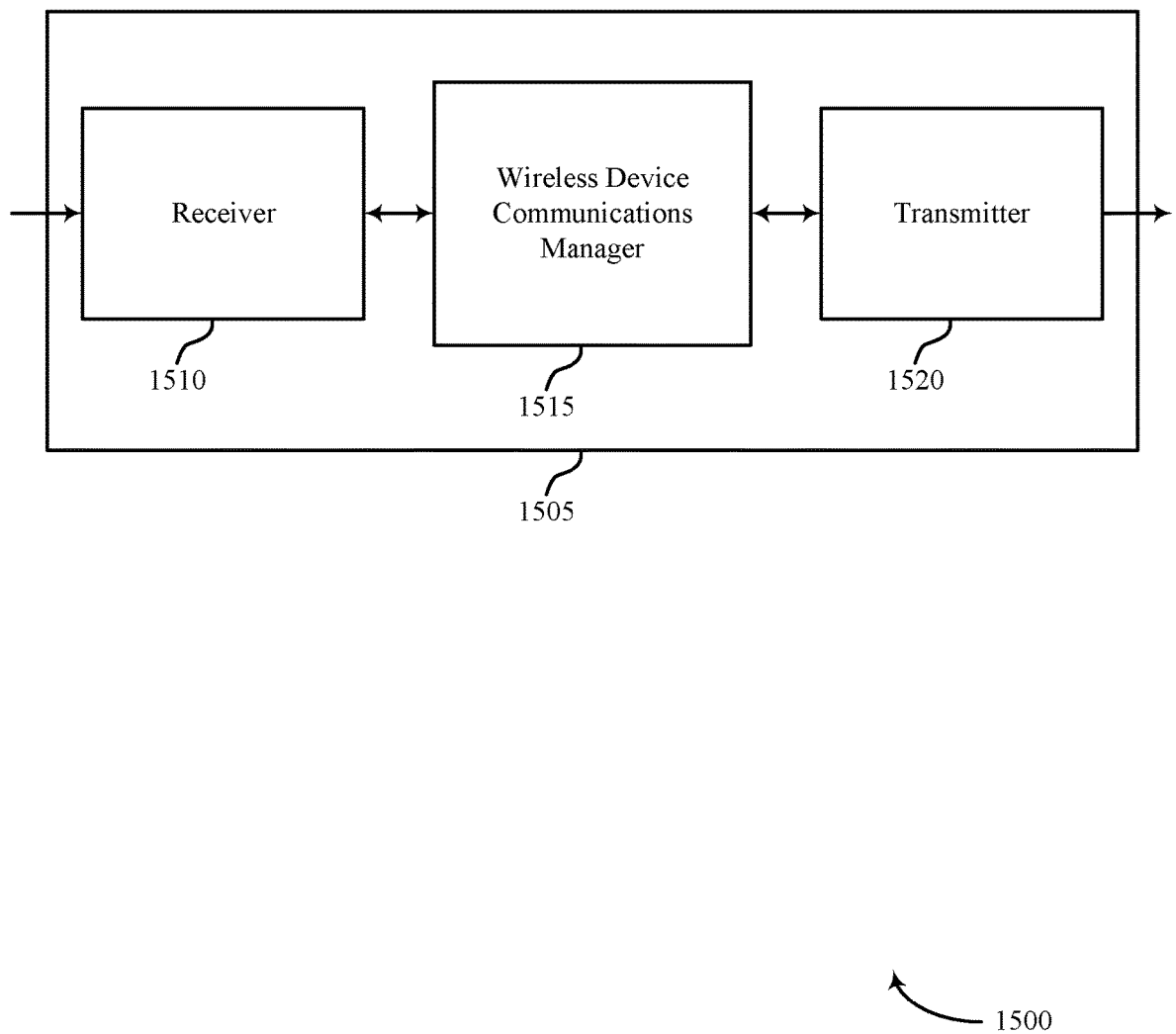
FIGS. 15 and 16 show block diagram of a wireless device that supports partial-interlace transmission techniques for AUL transmissions in accordance with aspects of the present disclosure.

FIG. 15 shows a block diagram 1500 of a wireless device 1505 that supports partial-interlace transmission techniques for AUL transmissions in accordance with aspects of the present disclosure. The wireless device 1505 may be an example of a UE 115 and/or a base station 105 as described with reference to FIGS. 2 through 14. The wireless device 1505 may include a receiver 1510, a wireless device communications manager 1515, and a transmitter 1520. The wireless device 1505 may also include a processor. Each of these components may be in communication with one another (e.g., via one or more buses).

The receiver 1510 may receive information such as packets, user data, or control information associated with various information channels (e.g., control channels, data channels, and information related to partial-interlace transmission for AUL transmissions, etc.). Information may be passed on to other components of the device. The receiver 1510 may be an example of aspects of the transceiver 1835 as described with reference to FIG. 18. The receiver 1510 may utilize a single antenna or a set of antennas.

The wireless device communications manager 1515 may be an example of aspects of the wireless device communications manager 1815 as described with reference to FIG. 18.

The wireless device communications manager 1515 and/or at least some of its various sub-components may be implemented in hardware, software executed by a processor, firmware, or any combination thereof. If implemented in software executed by a processor, the functions of the wireless device communications manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The wireless device communications manager 1515 and/or at least some of its various sub-components may be physically located at various positions, including being distributed such that portions of functions are implemented at different physical locations by one or more physical devices. In some examples, the wireless device communications manager 1515 and/or at least some of its various sub-components may be a separate and distinct component in accordance with aspects of the present disclosure. In other examples, the wireless device communications manager 1515 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

The wireless device communications manager 1515 may receive a channel interlace configuration for transmissions by the UE in a shared radio frequency spectrum band. The wireless device communications manager 1515 may perform a per-interlace LBT procedure by measuring an energy level of at least a portion of a channel interlace of the shared radio frequency spectrum band based on the received channel interlace configuration. The wireless device communications manager 1515 may determine an availability of the channel interlace based on the per-interlace LBT procedure and transmit over the channel interlace based on the determined availability.

The transmitter 1520 may transmit signals generated by other components of the device. In some examples, the transmitter 1520 may be collocated with a receiver 1510 in a transceiver module. For example, the transmitter 1520 may be an example of aspects of the transceiver 1835 as described with reference to FIG. 18. The transmitter 1520 may utilize a single antenna or a set of antennas.

Figure 16:
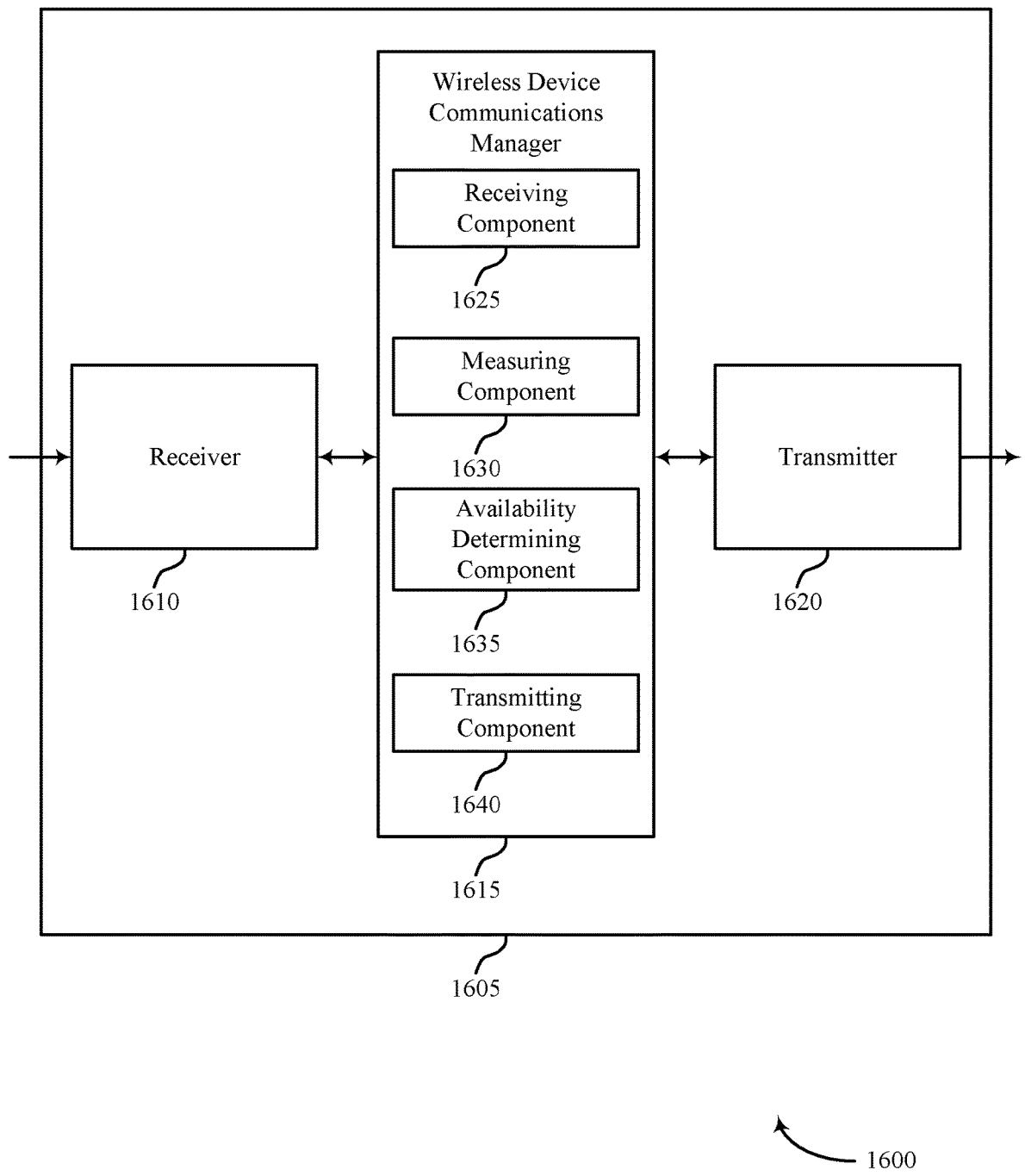

FIG. 16 shows a block diagram 1600 of a wireless device 1605 that supports partial-interlace transmission techniques for AUL transmissions in accordance with aspects of the present disclosure. The wireless device 1605 may be an example of aspects of a wireless device 1505 as described with reference to FIG. 15 or a UE 115 and/or a base station 105 as described with reference to FIGS. 2 through 14. The wireless device 1605 may include a receiver 1610, a wireless device communications manager 1615, and a transmitter 1620. The wireless device 1605 may also include a processor. Each of these components may be in communication with one another (e.g., via one or more buses).

The receiver 1610 may receive information such as packets, user data, or control information associated with various information channels (e.g., control channels, data channels, and information related to partial-interlace transmission for AUL transmissions, etc.). Information may be passed on to other components of the device. The receiver 1610 may be an example of aspects of the transceiver 1835 as described with reference to FIG. 18. The receiver 1610 may utilize a single antenna or a set of antennas.

The wireless device communications manager 1615 may be an example of aspects of the wireless device communications manager 1815 as described with reference to FIG. 18. The wireless device communications manager 1615 may also include a receiving component 1625, a measuring component 1630, an availability determining component 1635, and a transmitting component 1640.

The receiving component 1625 may receive a channel interlace configuration for transmissions by the UE in a shared radio frequency spectrum band. In some cases, performing the per-interlace LBT procedure may include receiving an indication of a starting OFDM symbol for the UE.

The measuring component 1630 may perform a per-interlace LBT procedure by measuring an energy level of at least a portion of a channel interlace of the shared radio frequency spectrum band based on the received channel interlace configuration. The measuring component 1630 may determine an energy level of a second channel interlace adjacent to the channel interlace, where the filler signal may be transmitted based on the energy level of the second channel interlace. The measuring component 1630 may perform a full-interlace LBT procedure by measuring an energy level of a full-channel interlace of the shared radio frequency spectrum band. In some cases, performing the per-interlace LBT procedure may include measuring the energy level of a subset of resource elements (REs) of the portion of the channel interlace.

The availability determining component 1635 may determine an availability of the channel interlace based on the per-interlace LBT procedure.

Transmitting component 1640 may transmit over the channel interlace based on the determined availability and transmit a filler signal following the per-interlace LBT procedure and prior to the indicated starting OFDM symbol based on a result of the per-interlace LBT procedure. In some cases, the filler signal is transmitted using a subset of resource elements (REs) of the portion of the channel interlace. In some cases, the filler signal includes an extended cyclic prefix.

The transmitter 1620 may transmit signals generated by other components of the device. In some examples, the transmitter 1620 may be collocated with a receiver 1610 in a transceiver module. For example, the transmitter 1620 may be an example of aspects of the transceiver 1835 as described with reference to FIG. 18. The transmitter 1620 may utilize a single antenna or a set of antennas.

Figure 17:
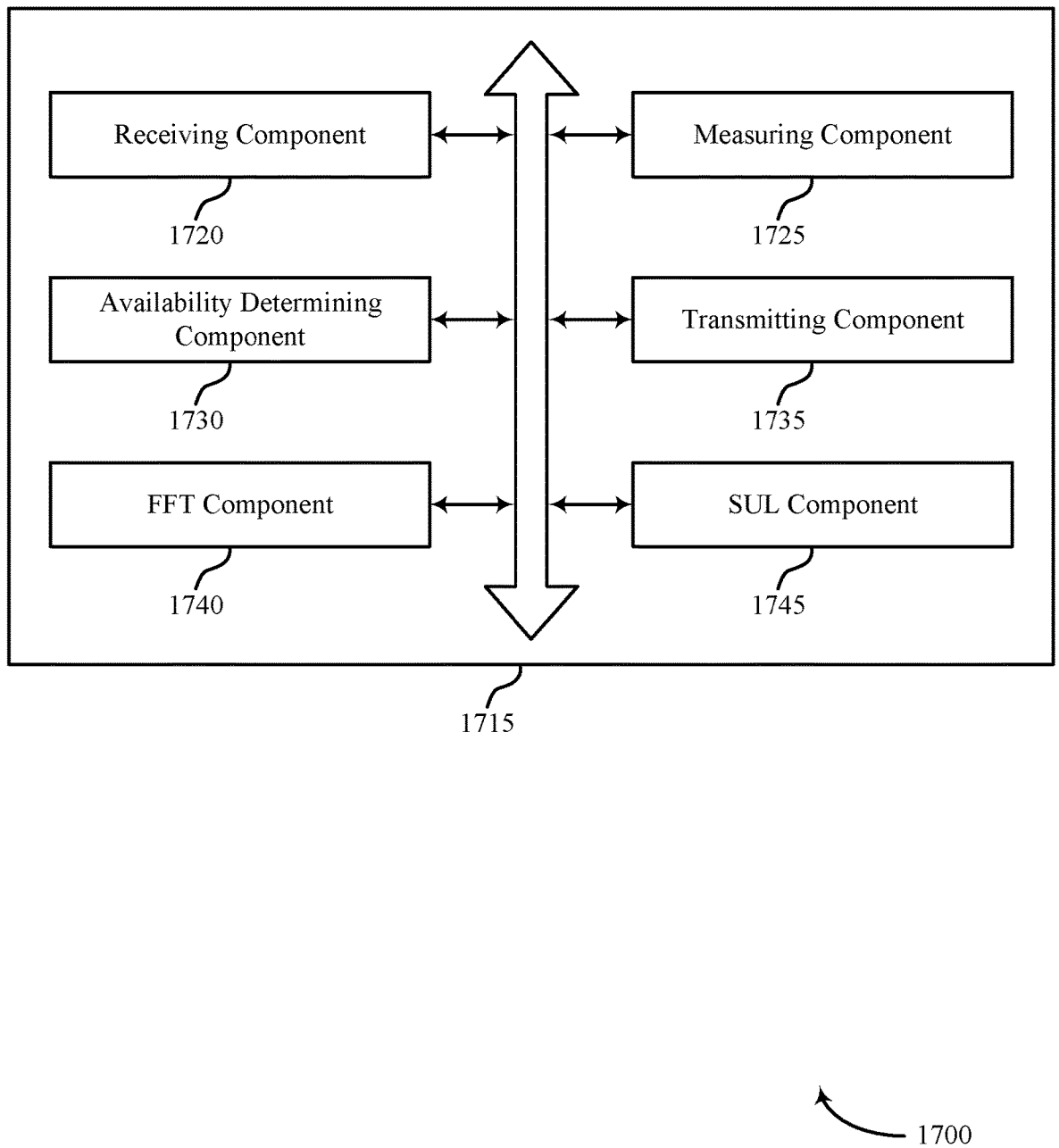
FIG. 17 shows a block diagram of a wireless device communications manager that supports partial-interlace transmission techniques for AUL transmissions in accordance with aspects of the present disclosure.

FIG. 17 shows a block diagram 1700 of a wireless device communications manager 1715 that supports partial-interlace transmission techniques for AUL transmissions in accordance with aspects of the present disclosure. The wireless device communications manager 1715 may be an example of aspects of a wireless device communications manager 1815 described with reference to FIGS. 15, 16, and 18. The wireless device communications manager 1715 may include a receiving component 1720, a measuring component 1725, an availability determining component 1730, a transmitting component 1735, a FFT component 1740, and a SUL component 1745. Each of these modules may communicate, directly or indirectly, with one another (e.g., via one or more buses).

The receiving component 1720 may receive a channel interlace configuration for transmissions by the UE in a shared radio frequency spectrum band. In some cases, performing the per-interlace LBT procedure may include receiving an indication of a starting OFDM symbol for the UE.

The measuring component 1725 may perform a per-interlace LBT procedure by measuring an energy level of at least a portion of a channel interlace of the shared radio frequency spectrum band based on the received channel interlace configuration. The measuring component 1725 may determine an energy level of a second channel interlace adjacent to the channel interlace where the filler signal may be transmitted based on the energy level of the second channel interlace. The measuring component 1725 may perform a full-interlace LBT procedure by measuring an energy level of a full-channel interlace of the shared radio frequency spectrum band. In some cases, performing the per-interlace LBT procedure may include measuring the energy level of a subset of REs of the portion of the channel interlace.

The availability determining component 1730 may determine an availability of the channel interlace based on the per-interlace LBT procedure.

The transmitting component 1735 may transmit over the channel interlace based on the determined availability and transmit a filler signal following the per-interlace LBT procedure and prior to the indicated starting OFDM symbol based on a result of the per-interlace LBT procedure. In some cases, the filler signal is transmitted using a subset of REs of the portion of the channel interlace. In some cases, the filler signal includes an extended cyclic prefix.

The FFT component 1740 may perform the per-interlace LBT procedure. In some cases, performing the per-interlace LBT procedure may include performing a FFT on the measured energy level of at least the portion of the channel interlace.

SUL component 1745 may configure a SUL configuration. In some cases, the channel interlace configuration includes a SUL configuration.

Figure 18:
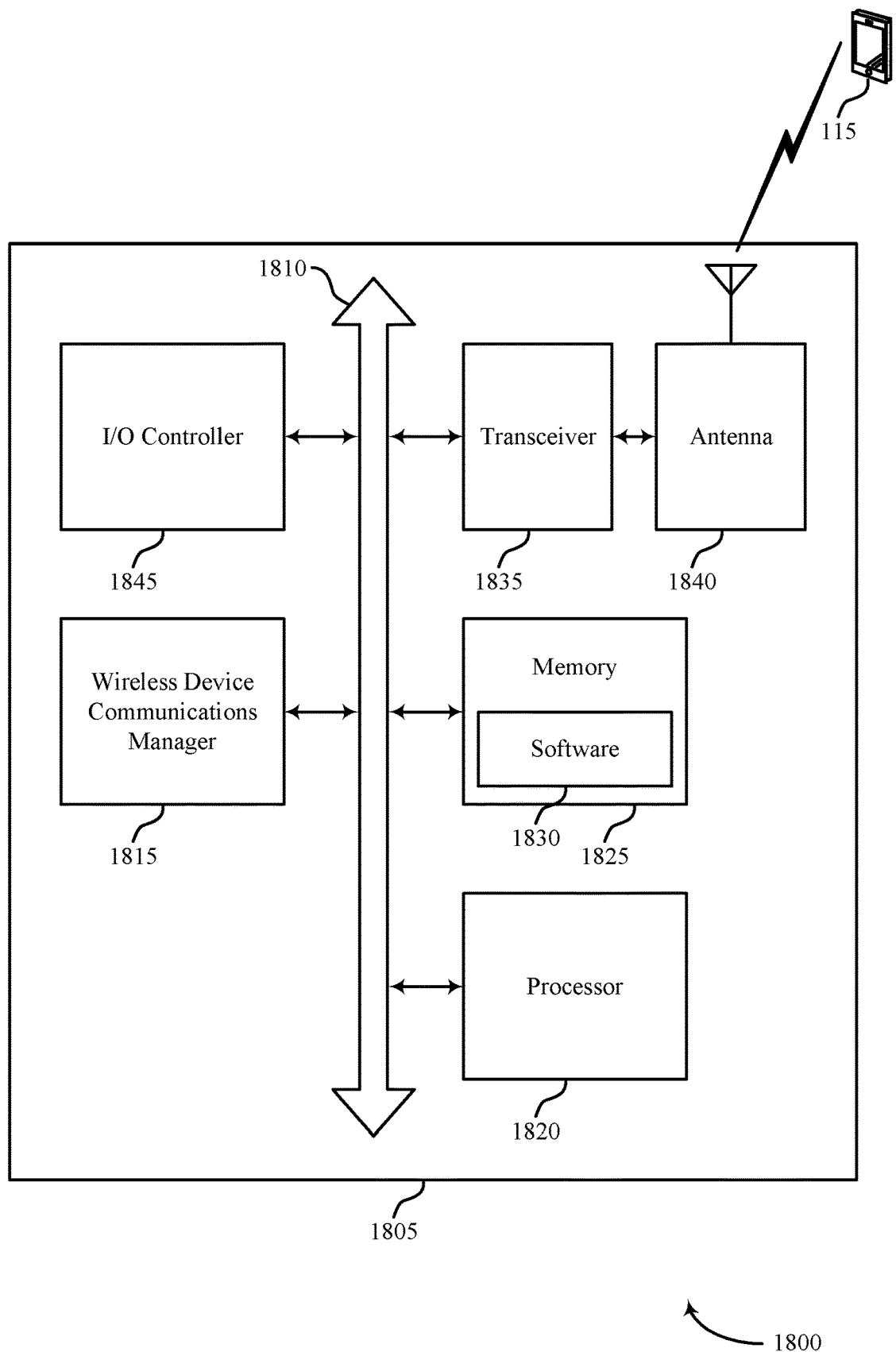
FIG. 18 shows a diagram of a wireless communications system 1800 including a wireless device that supports partial-interlace transmission techniques for AUL transmissions in accordance with aspects of the present disclosure.

FIG. 18 shows a diagram of a wireless communications system 1800 including a wireless device 1805 that supports partial-interlace transmission techniques for AUL transmissions in accordance with aspects of the present disclosure. The wireless device 1805 may be an example of aspects of a wireless device as described with reference to FIGS. 15 through 17 or a UE 115 and/or a base station 105 as described with reference to FIGS. 2 through 14. The wireless device 1805 may include components for bi-directional voice and data communications including components for transmitting and receiving communications, including a wireless device communications manager 1815, a processor 1820, a memory 1825, a software 1830, a transceiver 1835, an antenna 1840, and an I/O controller 1845. These components may be in electronic communication via one or more buses (e.g., bus 1810).

The processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1820 may be configured to operate a memory array using a memory controller. In other cases, a memory controller may be integrated into the processor 1820. The processor 1820 may be configured to execute computer-readable instructions stored in a memory to perform various functions (e.g., functions or tasks supporting partial-interlace transmission for AUL transmissions).

The memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware or software operation such as the interaction with peripheral components or devices.

The software 1830 may include code to implement aspects of the present disclosure, including code to support partial-interlace transmission techniques for AUL transmissions. The software 1830 may be stored in a non-transitory computer-readable medium such as system memory or other memory. In some cases, the software 1830 may not be directly executable by the processor but may cause a computer (e.g., when compiled and executed) to perform functions described herein.

The transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device 1805 may include a single antenna 1840. However, in some cases the device may have more than one antenna 1840, which may be capable of concurrently transmitting or receiving multiple wireless transmissions.

The I/O controller 1845 may manage input and output signals for the wireless device 1805. The I/O controller 1845 may also manage peripherals not integrated into the wireless device 1805. In some cases, the I/O controller 1845 may represent a physical connection or port to an external peripheral. In some cases, the I/O controller 1845 may utilize an operating system such as iOS®, ANDROID®, MS-DOS®, MS-WINDOWS®, OS/2®, UNIX®, LINUX®, or another known operating system. In other cases, the I/O controller 1845 may represent or interact with a modem, a keyboard, a mouse, a touchscreen, or a similar device. In some cases, the I/O controller 1845 may be implemented as part of a processor. In some cases, a user may interact with the wireless device 1805 via the I/O controller 1845 or via hardware components controlled by the I/O controller 1845.

Figure 19:
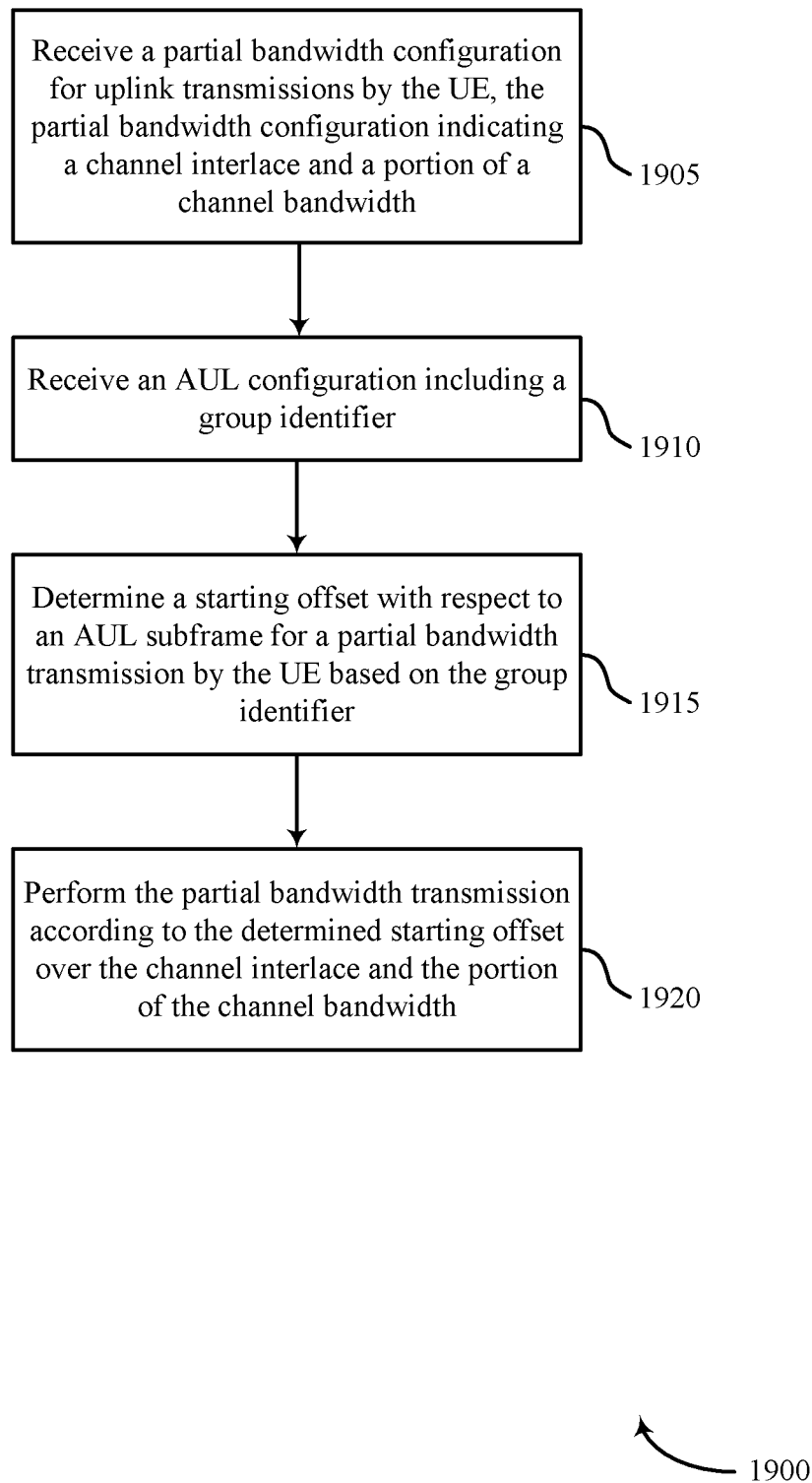
FIGS. 19 through 23 show flowcharts illustrating methods for partial-interlace transmission techniques for AUL transmissions in accordance with aspects of the present disclosure.

FIG. 19 shows a flowchart illustrating a method 1900 for partial-interlace transmission techniques for AUL transmissions in accordance with aspects of the present disclosure. The operations of the method 1900 may be implemented by a UE 115 or its components as described herein. For example, the operations of the method 1900 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1905, the UE 115 may receive a partial bandwidth configuration for uplink transmissions by the UE, where the partial bandwidth configuration may indicate a channel interlace and a portion of a channel bandwidth. The operations of 1905 may be performed according to the methods described herein. In certain examples, aspects of the operations of 1905 may be performed by a receiving component as described with reference to FIGS. 7 through 10.

At 1910, the UE 115 may receive an AUL configuration including a group identifier. The operations of 1910 may be performed according to the methods described herein. In certain examples, aspects of the operations of 1910 may be performed by a receiving component as described with reference to FIGS. 7 through 10.

At 1915, the UE 115 may determine a starting offset with respect to an AUL subframe for a partial bandwidth transmission by the UE based on the group identifier. The operations of 1915 may be performed according to the methods described herein. In certain examples, aspects of the operations of 1915 may be performed by a starting offset component as described with reference to FIGS. 7 through 10.

At 1920, the UE 115 may perform the partial bandwidth transmission according to the determined starting offset over the channel interlace and the portion of the channel bandwidth. The operations of 1920 may be performed according to the methods described herein. In certain examples, aspects of the operations of 1920 may be performed by a transmitting component as described with reference to FIGS. 7 through 10.

Figure 20:
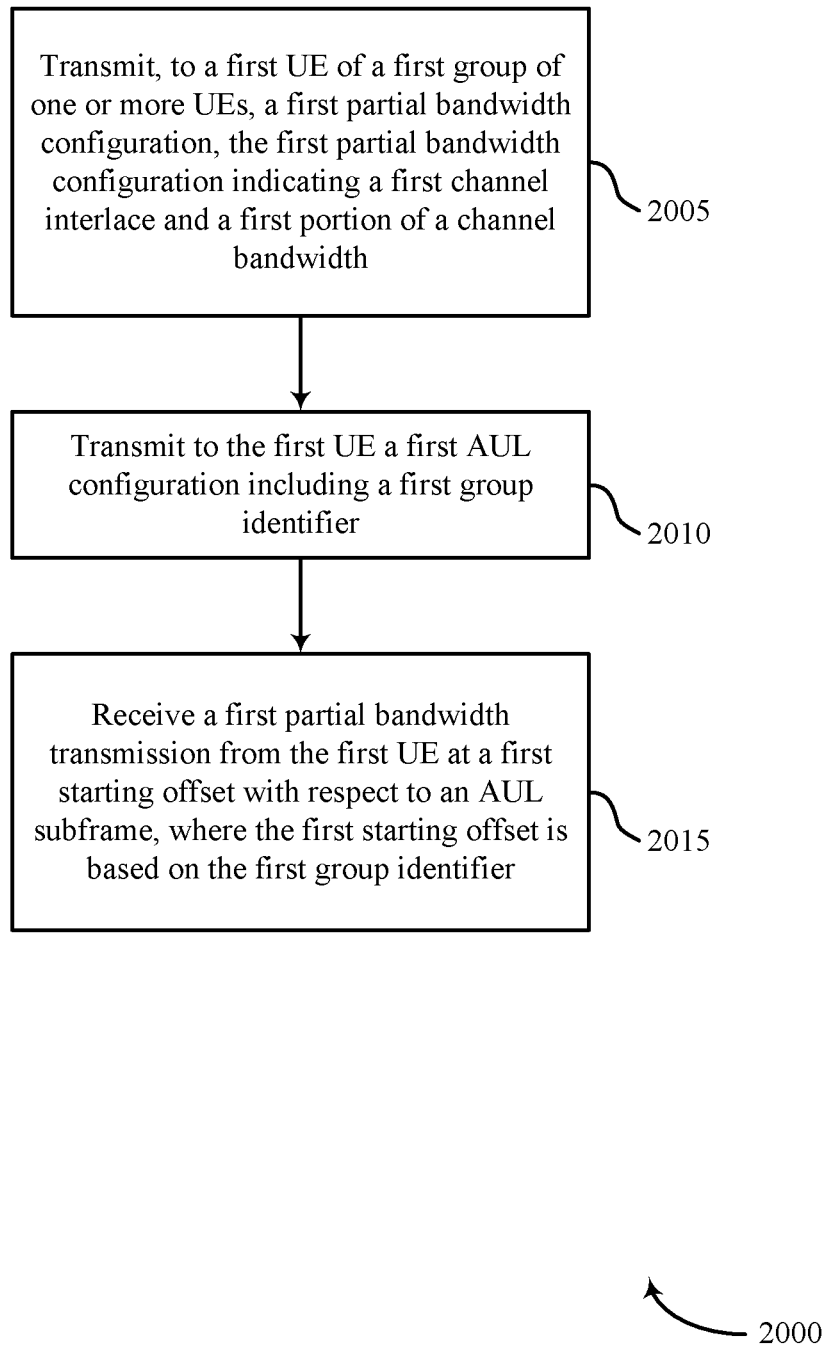

FIG. 20 shows a flowchart illustrating a method 2000 for partial-interlace transmission techniques for AUL transmissions in accordance with aspects of the present disclosure. The operations of the method 2000 may be implemented by a base station 105 or its components as described herein. For example, the operations of the method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2005, the base station 105 may transmit, to a first UE of a first group of one or more UEs, a first partial bandwidth configuration, the first partial bandwidth configuration indicating a first channel interlace and a first portion of a channel bandwidth. The operations of 2005 may be performed according to the methods described herein. In certain examples, aspects of the operations of 2005 may be performed by a transmitting component as described with reference to FIGS. 11 through 14.

At 2010, the base station 105 may transmit to the first UE a first AUL configuration including a first group identifier. The operations of 2010 may be performed according to the methods described herein. In certain examples, aspects of the operations of 2010 may be performed by a transmitting component as described with reference to FIGS. 11 through 14.

At 2015, the base station 105 may receive a first partial bandwidth transmission from the first UE at a first starting offset with respect to an AUL subframe, where the first starting offset may be based on the first group identifier. The operations of 2015 may be performed according to the methods described herein. In certain examples, aspects of the operations of 2015 may be performed by a receiving component as described with reference to FIGS. 11 through 14.

Figure 21:
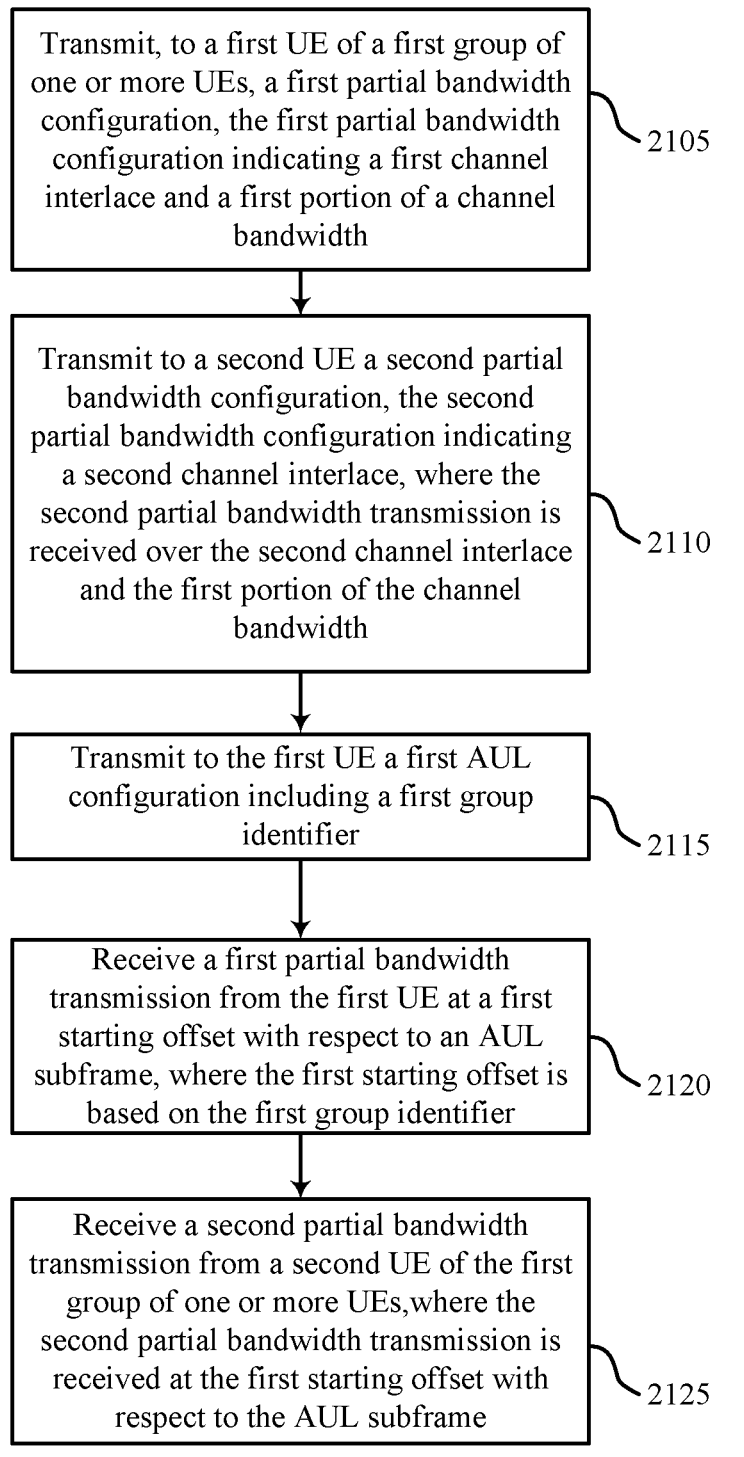

FIG. 21 shows a flowchart illustrating a method 2100 for partial-interlace transmission techniques for AUL transmissions in accordance with aspects of the present disclosure. The operations of the method 2100 may be implemented by a base station 105 or its components as described herein. For example, the operations of the method 2100 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2105, the base station 105 may transmit, to a first UE of a first group of one or more UEs, a first partial bandwidth configuration, where the first partial bandwidth configuration may indicate a first channel interlace and a first portion of a channel bandwidth. The operations of 2105 may be performed according to the methods described herein. In certain examples, aspects of the operations of 2105 may be performed by a transmitting component as described with reference to FIGS. 11 through 14.

At 2110, the base station 105 may transmit to a second UE a second partial bandwidth configuration, where the second partial bandwidth configuration may indicate a second channel interlace. In some cases, the second partial bandwidth transmission may be received over the second channel interlace and the first portion of the channel bandwidth. The operations of 2110 may be performed according to the methods described herein. In certain examples, aspects of the operations of 2110 may be performed by a transmitting component as described with reference to FIGS. 11 through 14.

At 2115, the base station 105 may transmit to the first UE a first AUL configuration including a first group identifier. The operations of 2115 may be performed according to the methods described herein. In certain examples, aspects of the operations of 2115 may be performed by a transmitting component as described with reference to FIGS. 11 through 14.

At 2120, the base station 105 may receive a first partial bandwidth transmission from the first UE at a first starting offset with respect to an AUL subframe where the first starting offset may be based on the first group identifier. The operations of 2120 may be performed according to the methods described herein. In certain examples, aspects of the operations of 2120 may be performed by a receiving component as described with reference to FIGS. 11 through 14.

At 2125, the base station 105 may receive a second partial bandwidth transmission from a second UE of the first group of one or more UEs, where the second partial bandwidth transmission may be received at the first starting offset with respect to the AUL subframe. The operations of 2125 may be performed according to the methods described herein. In certain examples, aspects of the operations of 2125 may be performed by a receiving component as described with reference to FIGS. 11 through 14.

Figure 22:
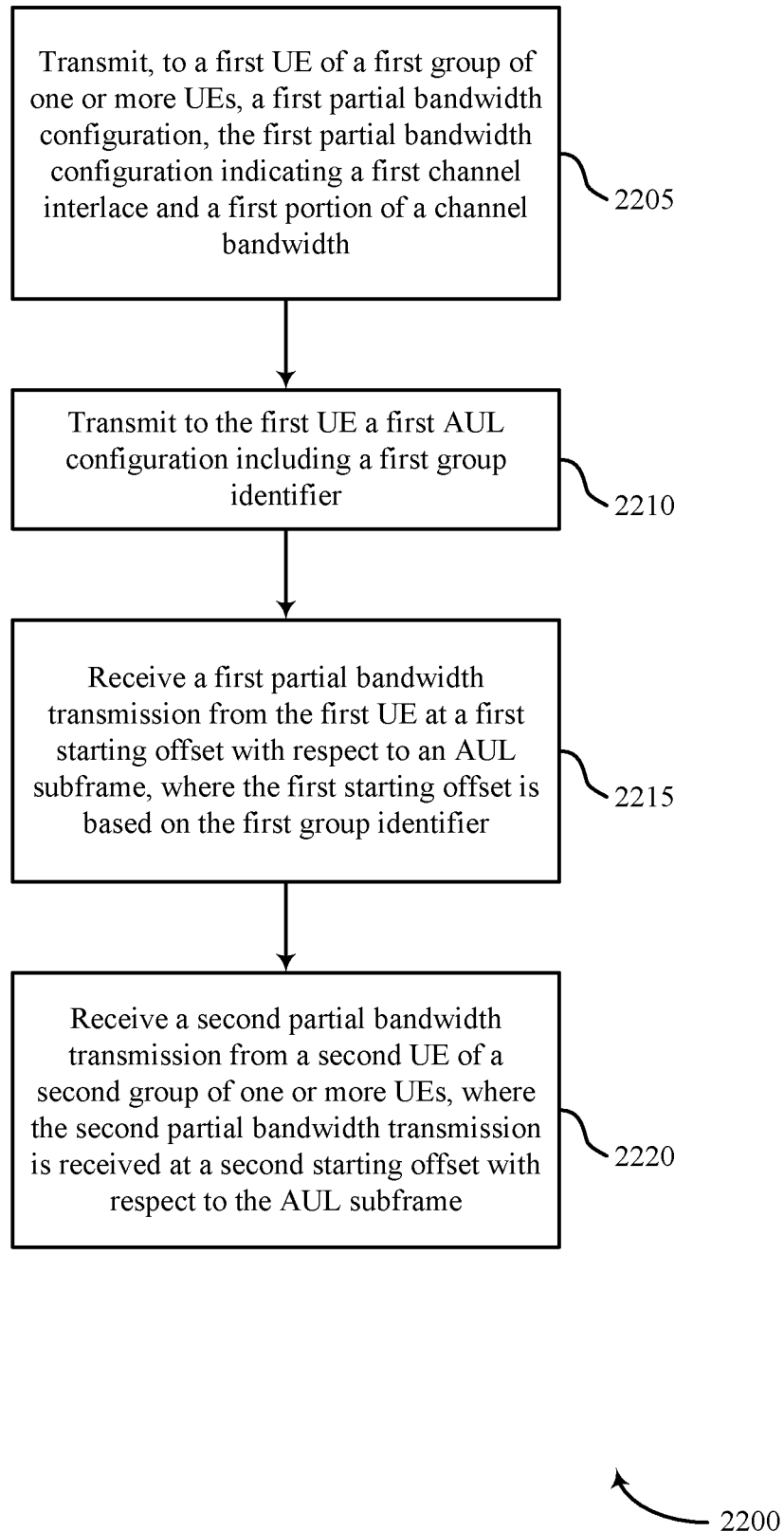

FIG. 22 shows a flowchart illustrating a method 2200 for partial-interlace transmission techniques for AUL transmissions in accordance with aspects of the present disclosure. The operations of the method 2200 may be implemented by a base station 105 or its components as described herein. For example, the operations of the method 2200 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2205, the base station 105 may transmit, to a first UE of a first group of one or more UEs, a first partial bandwidth configuration, where the first partial bandwidth configuration may indicate a first channel interlace and a first portion of a channel bandwidth. The operations of 2205 may be performed according to the methods described herein. In certain examples, aspects of the operations of 2205 may be performed by a transmitting component as described with reference to FIGS. 11 through 14.

At 2210, the base station 105 may transmit to the first UE a first AUL configuration including a first group identifier. The operations of 2210 may be performed according to the methods described herein. In certain examples, aspects of the operations of 2210 may be performed by a transmitting component as described with reference to FIGS. 11 through 14.

At 2215, the base station 105 may receive a first partial bandwidth transmission from the first UE at a first starting offset with respect to an AUL subframe, where the first starting offset may be based on the first group identifier. The operations of 2215 may be performed according to the methods described herein. In certain examples, aspects of the operations of 2215 may be performed by a receiving component as described with reference to FIGS. 11 through 14.

At 2220, the base station 105 may receive a second partial bandwidth transmission from a second UE of a second group of one or more UEs, where the second partial bandwidth transmission may be received at a second starting offset with respect to the AUL subframe. The operations of 2220 may be performed according to the methods described herein. In certain examples, aspects of the operations of 2220 may be performed by a receiving component as described with reference to FIGS. 11 through 14.

Figure 23:
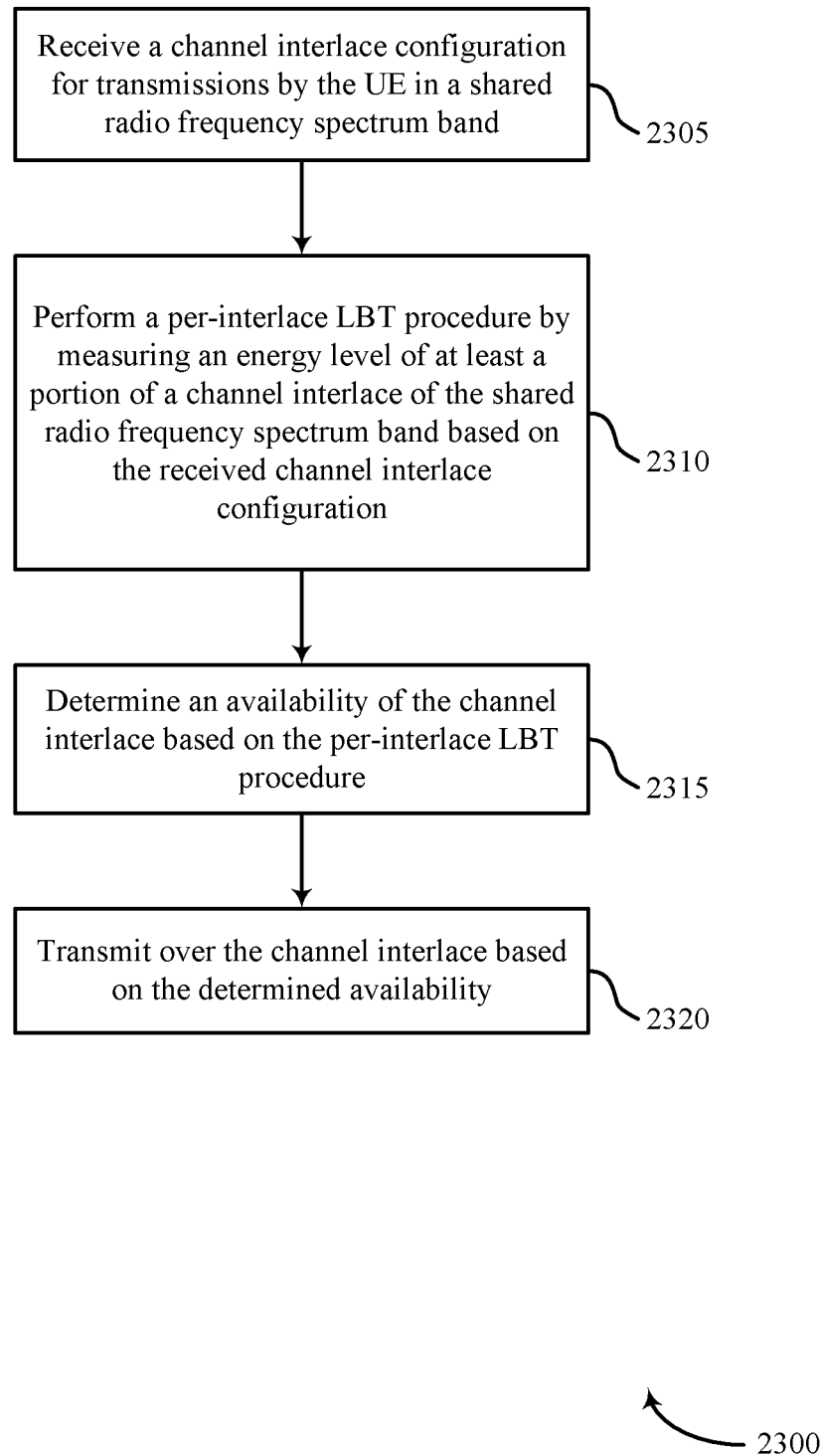

FIG. 23 shows a flowchart illustrating a method 2300 for partial-interlace transmission techniques for AUL transmissions in accordance with aspects of the present disclosure. The operations of the method 2300 may be implemented by a wireless device as described with reference to FIGS. 15 through 18 or a UE 115 and/or a base station 105 as described with reference to FIGS. 2 through 14 and 19 through 22. For example, the operations of the method 2300 may be performed by a wireless device communications manager as described with reference to FIGS. 15 through 18. In some examples, a wireless device may execute a set of codes to control the functional elements of the device to perform the functions described below. Additionally or alternatively, the wireless device may perform aspects of the functions described below using special-purpose hardware.

At 2305, the wireless device may receive a channel interlace configuration for transmissions by the UE in a shared radio frequency spectrum band. The operations of 2305 may be performed according to the methods described herein. In certain examples, aspects of the operations of 2305 may be performed by a receiving component as described with reference to FIGS. 15 through 18.

At 2310, the wireless device may perform a per-interlace LBT procedure by measuring an energy level of at least a portion of a channel interlace of the shared radio frequency spectrum band based on the received channel interlace configuration. The operations of 2310 may be performed according to the methods described herein. In certain examples, aspects of the operations of 2310 may be performed by a measuring component as described with reference to FIGS. 15 through 18.

At 2315, the wireless device may determine an availability of the channel interlace based on the per-interlace LBT procedure. The operations of 2315 may be performed according to the methods described herein. In certain examples, aspects of the operations of 2315 may be performed by a availability determining component as described with reference to FIGS. 15 through 18.

At 2320, the wireless device may transmit over the channel interlace based on the determined availability. The operations of 2320 may be performed according to the methods described herein. In certain examples, aspects of the operations of 2320 may be performed by a transmitting component as described with reference to FIGS. 15 through 18.

In some examples, aspects from two or more of the described methods may be combined. It should be noted that the described methods are just example implementations, and that the operations of the described methods may be rearranged or otherwise modified such that other implementations are possible.

Techniques described herein may be used for various wireless communications systems such as code-division multiple access (CDMA), time-division multiple access (TDMA), frequency-division multiple access (FDMA), orthogonal frequency-division multiple access (OFDMA), single carrier FDMA (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving a channel interlace configuration for transmissions by a user equipment (UE) in a shared radio frequency spectrum band;
   performing a per-interlace listen-before-talk (LBT) procedure by measuring an energy level of at least a portion of a channel interlace of the shared radio frequency spectrum band based at least in part on the received channel interlace configuration;
   determining an availability of the channel interlace based at least in part on the per-interlace LBT procedure; and
   transmitting over the channel interlace based at least in part on the determined availability.

2. The method of claim 1, wherein performing the per-interlace LBT procedure comprises:

performing a fast Fourier transform on the measured energy level of at least the portion of the channel interlace.

3. The method of claim 1, wherein the performing the per-interlace LBT procedure comprises measuring the energy level of a subset of resource elements (REs) of the portion of the channel interlace.

4. The method of claim 3, wherein the performing the per-interlace LBT procedure comprises:
receiving an indication of a starting orthogonal frequency-division multiplexing (OFDM) symbol for the UE; and
transmitting a filler signal following the per-interlace LBT procedure and prior to the indicated starting OFDM symbol based at least in part on a result of the per-interlace LBT procedure.

5. The method of claim 4, wherein the filler signal is transmitted using a subset of resource elements (REs) of the portion of the channel interlace.

6. The method of claim 4, wherein the filler signal comprises an extended cyclic prefix.

7. The method of claim 4, further comprising:
determining an energy level of a second channel interlace adjacent to the channel interlace, wherein the filler signal is transmitted based at least in part on the energy level of the second channel interlace.

8. The method of claim 4, wherein the channel interlace configuration comprises a scheduled uplink (SUL) configuration.

9. The method of claim 8, further comprising:
performing a full-interlace LBT procedure by measuring an energy level of a full-channel interlace of the shared radio frequency spectrum band.

10. An apparatus for wireless communications, comprising:
a processor;
memory coupled with the processor; and
instructions stored in the memory and executable by the processor to cause the apparatus to:
receive a channel interlace configuration for transmissions by a user equipment (UE) in a shared radio frequency spectrum band;
perform a per-interlace listen-before-talk (LBT) procedure by measuring an energy level of at least a portion of a channel interlace of the shared radio frequency spectrum band based at least in part on the received channel interlace configuration;
determine an availability of the channel interlace based at least in part on the per-interlace LBT procedure; and
transmit over the channel interlace based at least in part on the determined availability.

11. The apparatus of claim 10, wherein the instructions to perform the per-interlace LBT procedure are executable by the processor to cause the apparatus to:
perform a fast Fourier transform on the measured energy level of at least the portion of the channel interlace.

12. The apparatus of claim 10, wherein the performing the per-interlace LBT procedure comprises measuring the energy level of a subset of resource elements (REs) of the portion of the channel interlace.

13. The apparatus of claim 12, wherein the instructions to perform the per-interlace LBT procedure are executable by the processor to cause the apparatus to:
receive an indication of a starting orthogonal frequency-division multiplexing (OFDM) symbol for the UE; and
transmit a filler signal following the per-interlace LBT procedure and prior to the indicated starting OFDM symbol based at least in part on a result of the per-interlace LBT procedure.

14. The apparatus of claim 13, wherein the filler signal is transmitted using a subset of resource elements (REs) of the portion of the channel interlace.

15. The apparatus of claim 13, wherein the filler signal comprises an extended cyclic prefix.

16. The apparatus of claim 13, wherein the instructions are further executable by the processor to cause the apparatus to:
determine an energy level of a second channel interlace adjacent to the channel interlace, wherein the filler signal is transmitted based at least in part on the energy level of the second channel interlace.

17. The apparatus of claim 13, wherein the channel interlace configuration comprises a scheduled uplink (SUL) configuration.

18. The apparatus of claim 17, wherein the instructions are further executable by the processor to cause the apparatus to:
perform a full-interlace LBT procedure by measuring an energy level of a full-channel interlace of the shared radio frequency spectrum band.

19. A non-transitory computer-readable medium storing code for wireless communications, the code comprising instructions executable by a processor to:
receive a channel interlace configuration for transmissions by a user equipment (UE) in a shared radio frequency spectrum band;
perform a per-interlace listen-before-talk (LBT) procedure by measuring an energy level of at least a portion of a channel interlace of the shared radio frequency spectrum band based at least in part on the received channel interlace configuration;
determine an availability of the channel interlace based at least in part on the per-interlace LBT procedure; and
transmit over the channel interlace based at least in part on the determined availability.

20. The non-transitory computer-readable medium of claim 19, wherein the instructions to perform the per-interlace LBT procedure are executable by the processor to:
perform a fast Fourier transform on the measured energy level of at least the portion of the channel interlace.

\* \* \* \* \*